United States Patent
Sakai et al.

(10) Patent No.: US 8,256,216 B2
(45) Date of Patent: Sep. 4, 2012

(54) VEHICULAR BRAKE APPARATUS

(75) Inventors: Kouji Sakai, Nagano (JP); Hiromitsu Takizawa, Nagano (JP); Takashi Kinoshita, Nagano (JP); Yoshiteru Matsunaga, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 833 days.

(21) Appl. No.: 12/410,589

(22) Filed: Mar. 25, 2009

(65) Prior Publication Data
US 2009/0241539 A1  Oct. 1, 2009

(30) Foreign Application Priority Data
Mar. 28, 2008  (JP) .............................. P. 2008-086264

(51) Int. Cl.
*B60T 13/128* (2006.01)
(52) U.S. Cl. .......................................... 60/553; 60/582
(58) Field of Classification Search .................. 60/550, 60/552, 553, 582
See application file for complete search history.

(56) References Cited

U.S. PATENT DOCUMENTS

| | | | |
|---|---|---|---|
| 4,732,001 A | 3/1988 | Belart | |
| 5,029,951 A | 7/1991 | Nishii | |
| 5,878,573 A | 3/1999 | Kobayashi et al. | |
| 2002/0023437 A1 | 2/2002 | Kanazawa et al. | |
| 2002/0140283 A1 | 10/2002 | Kusano et al. | |
| 2005/0121973 A1 | 6/2005 | Matsuno et al. | |
| 2005/0126167 A1 | 6/2005 | Matsuno et al. | |
| 2005/0162009 A1 | 7/2005 | Matsuno et al. | |

FOREIGN PATENT DOCUMENTS

| | | |
|---|---|---|
| DE | 102006015104 | 10/2006 |
| EP | 1538045 | 6/2005 |
| EP | 1538047 | 6/2005 |
| EP | 1538049 | 6/2005 |
| JP | 2006-193107 | 7/2006 |
| JP | 2006-240542 | 9/2006 |
| JP | 2006-281994 | 10/2006 |

*Primary Examiner* — Daniel Lopez
(74) *Attorney, Agent, or Firm* — Andrew M. Calderon; Roberts Mlotkowski Safran & Cole, P.C.

(57) ABSTRACT

An annular sealing member 95 for establishing sealing between a boosted hydraulic pressure application chamber 22 and an input-side annular chamber 93 formed between a casing and a backup piston 64A and connected to a hydraulic pressure source is disposed between the casing and the backup piston 64A, and communication passage 216 for establishing communication between the input-side annular chamber 93 and the boosted hydraulic pressure application chamber 22 as the backup piston 64A moves forward by a predetermined stroke or more is provided in one of the backup piston 64A and the casing.

3 Claims, 9 Drawing Sheets

VEHICULAR BRAKE APPARATUS

BACKGROUND OF THE INVENTION

1. Field of the Invention

The present invention relates to a vehicular brake apparatus having a master cylinder, a hydraulic pressure source, and a hydraulic pressure booster.

2. Description of Related Art

There is a vehicular brake apparatus having:

a master cylinder including: a casing; and a master piston of which rear face faces a boosted hydraulic pressure application chamber and which is slidably accommodated in the casing;

a hydraulic pressure source; and a hydraulic pressure booster including:

a backup piston which is slidably fitted into the casing while a front face thereof facing the boosted hydraulic pressure application chamber and a retraction limit thereof is restricted; and a pressure regulator built into the backup piston and adjusting the hydraulic pressure output from the hydraulic pressure source and applying the hydraulic pressure to the boosted hydraulic pressure application chamber. In this vehicular brake apparatus, the backup piston moves forward to directly push the master piston against the hydraulic pressure force due to the hydraulic pressure output from the hydraulic pressure source when the hydraulic pressure of the boosted hydraulic pressure application chamber is low.

In this kind of vehicular brake apparatus, when the hydraulic pressure of the boosted hydraulic pressure application chamber is low, the backup piston is moved forward by moving a control piston forward against the hydraulic pressure force due to the hydraulic pressure output from the hydraulic pressure source so that the backup piston directly pushes the master piston, whereby an effective brake hydraulic pressure can be output from the master cylinder. When the hydraulic pressure of the boosted hydraulic pressure application chamber has lowered due to abnormality in the hydraulic pressure source, since the hydraulic pressure force due to the hydraulic pressure output from the hydraulic pressure and applied to the control piston is small, the operation force required to move the backup piston forward and to directly push the master piston can be made relatively small.

However, when the hydraulic pressure of the boosted hydraulic pressure application chamber has lowered due to abnormality in the pressure regulator while the hydraulic pressure source operates normally, it is necessary to move the control piston forward against the hydraulic pressure force due to the hydraulic pressure output from the hydraulic pressure source and to further move the backup piston forward while directly pushing the master pistols. As a result, a large braking operation force is required to output an effective brake hydraulic pressure from the master cylinder.

To solve this problem, Japanese Patent Unexamined Publication JP-A-2006-240542 proposes a vehicular brake apparatus. In this vehicular brake apparatus, an electromagnetic valve other than the pressure regulator of the hydraulic pressure booster is provided in the hydraulic pressure passage for establishing connection between the hydraulic pressure source and the boosted hydraulic pressure application chamber When any abnormality has occurred in the pressure regulator, the electromagnetic valve is opened to transmit the hydraulic pressure output from the hydraulic pressure source to the boosted hydraulic pressure application chamber, whereby an effective brake hydraulic pressure can be output from the master cylinder by applying a relatively small braking operation force even when the pressure regulator is abnormal.

SUMMARY OF THE INVENTION

However, the vehicular brake apparatus of JP-A-2006-240542 requires the electromagnetic valve other than the pressure regulator of the hydraulic pressure booster, and the number of components required increases. Furthermore, if the electromagnetic valve has seized in its closed position, a large braking operation force is required to directly push the backup piston using the master piston.

In consideration of these circumstances, an object of the present invention is to provide a vehicular brake apparatus having a simple configuration in which the number of components is avoided from increasing, wherein, when the hydraulic pressure of a boosted hydraulic pressure application chamber is low due to abnormality in a pressure regulator, an effective brake hydraulic pressure is output securely from a master cylinder by applying a small braking operation force, For attaining the above-mentioned object, according to an aspect of the present invention, there is provided a vehicular brake apparatus including:

a master cylinder (M) including:

a casing (15A, 15B); and a master piston of which rear face faces a boosted hydraulic pressure application chamber (22) and which is slidably accommodated in the casing (15A, 15B);

a hydraulic pressure source (12) capable of generating hydraulic pressure regardless of an operation of a brake operation member (11); and a hydraulic pressure booster (13A, 13B) including:

a backup piston (64A, 64B) which is slidably fitted into the casing (15A, 15B) while a front face thereof facing the boosted hydraulic pressure application chamber (22) and a retraction limit thereof is restricted;

a pressure regulator (65) built into the backup piston (64A, 64B) and being capable of adjusting the hydraulic pressure output from the hydraulic pressure source (12) and applying the hydraulic pressure to the boosted hydraulic pressure application chamber (22); and a control piston (66) operating to balance reaction force due to the hydraulic pressure of the boosted hydraulic pressure application chamber (22) with braking operation force of the brake operation member (11) and to enable the pressure regulator (65) to perform pressure adjustment, wherein the backup piston (64A, 64B) moves forward to directly push the master piston (23) against the hydraulic pressure force due to the hydraulic pressure output from the hydraulic pressure source (12) as the brake operation force is transmitted from the control piston (66) to the backup piston (64A, 64B) when the hydraulic pressure of the boosted hydraulic pressure application chamber (22) is low, wherein an input-side annular chamber (93, 184) connected to the hydraulic pressure source (12) is provided between the casing (15A, 15B) and the backup piston (64A, 64B), an annular sealing member (95, 186) which seals between the boosted hydraulic pressure application chamber (22) and the input-side annular chamber (93, 184) is disposed between the casing (15A, 15B) and the backup piston (64A, 64B), and a communication passage (216, 188) is provided in one of the backup piston (64A, 64B) and the casing (15A, 15B), and the communication passage communicates the input-side annular chamber (93, 184) with the boosted hydraulic pressure application chamber (22) as the backup piston (64A, 64B) moves forward by a predetermined stroke or more so as to directly push the master piston (23).

Further, according to another aspect of the present invention, there is provided a vehicular brake apparatus including:
a master cylinder (M) including;
a casing (15C, 15D); and
a master piston of which rear face faces a boosted hydraulic pressure application chamber (22) and which is slidably accommodated in the casing (15C, 15D);
a hydraulic pressure source (12) capable of generating hydraulic pressure regardless of an operation of a brake operation member (11); and
a hydraulic pressure booster (13A, 13B) including:
a backup piston (64C, 64D) which is slidably fitted into the casing (15C, 15D) while a front face thereof facing the boosted hydraulic pressure application chamber (22) and a retraction limit thereof is restricted;
a pressure regulator (65) built into the backup piston (64C, 64D) and being capable of adjusting the hydraulic pressure output from the hydraulic pressure source (12) and applying the hydraulic pressure to the boosted hydraulic pressure application chamber (22); and
a control piston (66) operating to balance reaction force due to the hydraulic pressure of the boosted hydraulic pressure application chamber (22) with braking operation force of the brake operation member (11) and to enable the pressure regulator (65) to perform pressure adjustment,
wherein the backup piston (64C, 64D) moves forward to directly push the master piston (23) against the hydraulic pressure force due to the hydraulic pressure output from the hydraulic pressure source (12) as the brake operation force is transmitted from the control piston (66) to the backup piston (64C, 64D) when the hydraulic pressure of the boosted hydraulic pressure application chamber (22) is low,
wherein an input-side annular chamber (228, 242) connected to the hydraulic pressure source (12) is provided between the casing (15C, 15D) and the backup piston (64C, 64D),
a release chamber (76, 132) connected to a reservoir (31) is provided inside the casing (15C, 15D),
an annular sealing member (233, 244) sealing between the input-side annular chamber (228, 242) and the release chamber (76, 132) is provided between the casing (15C, 15D) and the backup piston (64C, 64D), and
a communication passage (237, 245) is provided in one of the casing (15A, 15B) and the backup piston (64C, 64D), and
the communication passage (237, 245) communicates the input-side annular chamber (228, 242) with the release chamber (76, 132) as the backup piston (64C, 64D) moves forward by a predetermined stroke or more so as to directly push the master piston (23).

Furthermore, according to still another aspect of the present invention, it is adaptable that in the vehicular brake apparatus,
the control piston (66) is formed into a bottomed cylindrical shape having an end wall (66a) at the front end thereof,
a stroke simulator (14) is disposed between the brake operation member (11) and the control piston (66) so as to obtain an operation stroke feeling of the brake operation member (11),
the stroke simulator (14) includes:
an input member (197) connected to the brake operation member (11);
a simulator piston (194) slidably fitted into the control piston (66) and interlockingly connected to the input rod (197);
a stroke fluid chamber (193) defined between the simulator piston (194) and the end wall (66a of the control piston (66) and; and
an elastic member (195) provided between the simulator piston (194) and the control piston (66), and
an opening (205) which allows the stroke fluid chamber (193) to communicate with the reservoir (31) is provided in the end wall (66a) of the control piston (66),
when a forward movement amount of the control piston (66) with respect to the backup piston (64) becomes more than a threshold value, the opening (205) is closed.

In the present invention, a brake pedal 11 according to first to third embodiments corresponds to the brake operation member, an input rod 197 according to the first to third embodiments corresponds to the input member, and O-rings 233 and 244 according to the first to third embodiments correspond to the sealing members according to the present invention.

According to the aspect of the present invention, as the backup piston moves forward by the predetermined stroke or more so as to directly push the master piston, the input-side annular chamber connected to the hydraulic pressure source communicates with the boosted hydraulic pressure application chamber via the communication passage provided in one of the backup piston and the casing. With this simple configuration having small number of components, when the hydraulic pressure of the boosted hydraulic pressure application chamber is low due to abnormality in the pressure regulator, the master piston of the master cylinder can be moved forward by applying the hydraulic pressure output from the hydraulic pressure source to the master piston, and the brake hydraulic pressure can be output securely from the master cylinder by applying a small braking operation force.

According to the another aspect of the present invention, as the backup piston moves forward by the predetermined stroke or more so as to directly push the master piston, the input-side annular chamber connected to the hydraulic pressure source communicates with the release chamber connected to the reservoir via the communication passage provided in one of the casing and the backup piston. With this simple configuration having small number of components, when the hydraulic pressure of the boosted hydraulic pressure application chamber is low due to abnormality in the pressure regulator, the master piston of the master cylinder can be moved forward by directly pushing the master piston using the backup piston to which the hydraulic pressure output from the hydraulic pressure source is not applied from the side opposite to the application direction of the braking operation force. As a result, the brake hydraulic pressure can be output securely from the master cylinder by applying a small braking operation force.

Furthermore, according to the still another aspect of the present invention, as the forward movement amount of the control piston with respect to the backup piston becomes more than the threshold value, the stroke fluid chamber is in a tightly closed state, and the forward movement of the simulator piston with respect to the control piston is restricted. As a result, the increase in the stroke of the brake operation member due to use of the stroke simulator can be suppressed, and the operation feeling of the brake operation member can be improved.

DETAILED DESCRIPTION OF EXEMPLARY EMBODIMENTS OF THE PRESENT INVENTION

Embodiments according to the present invention will be described below with referring to the accompanying drawings.

<First Embodiment>

Figure 1:
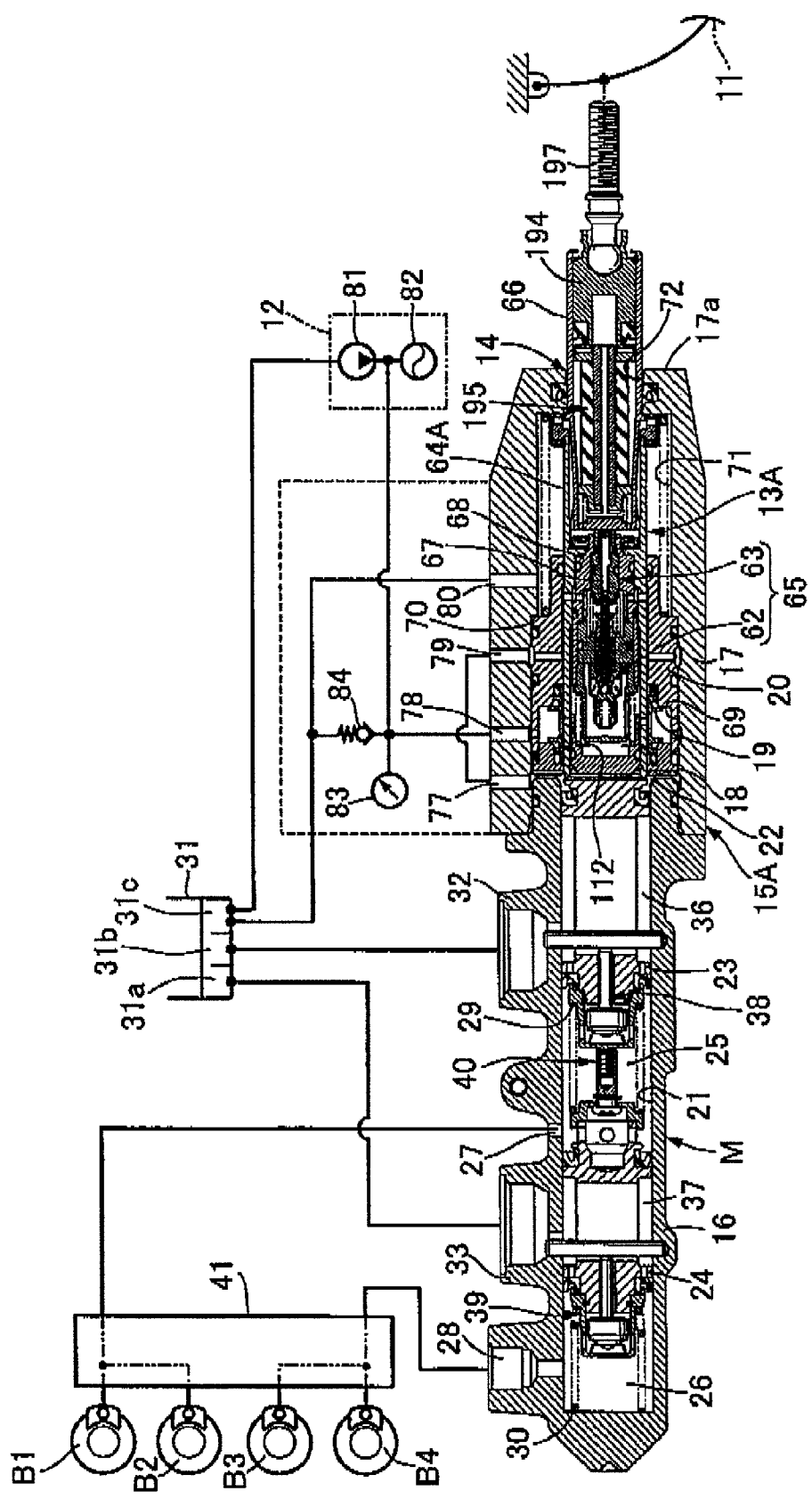
FIG. 1 is a brake hydraulic pressure system diagram showing the entire configuration of a vehicular brake apparatus according to a first embodiment.
Figure 2:
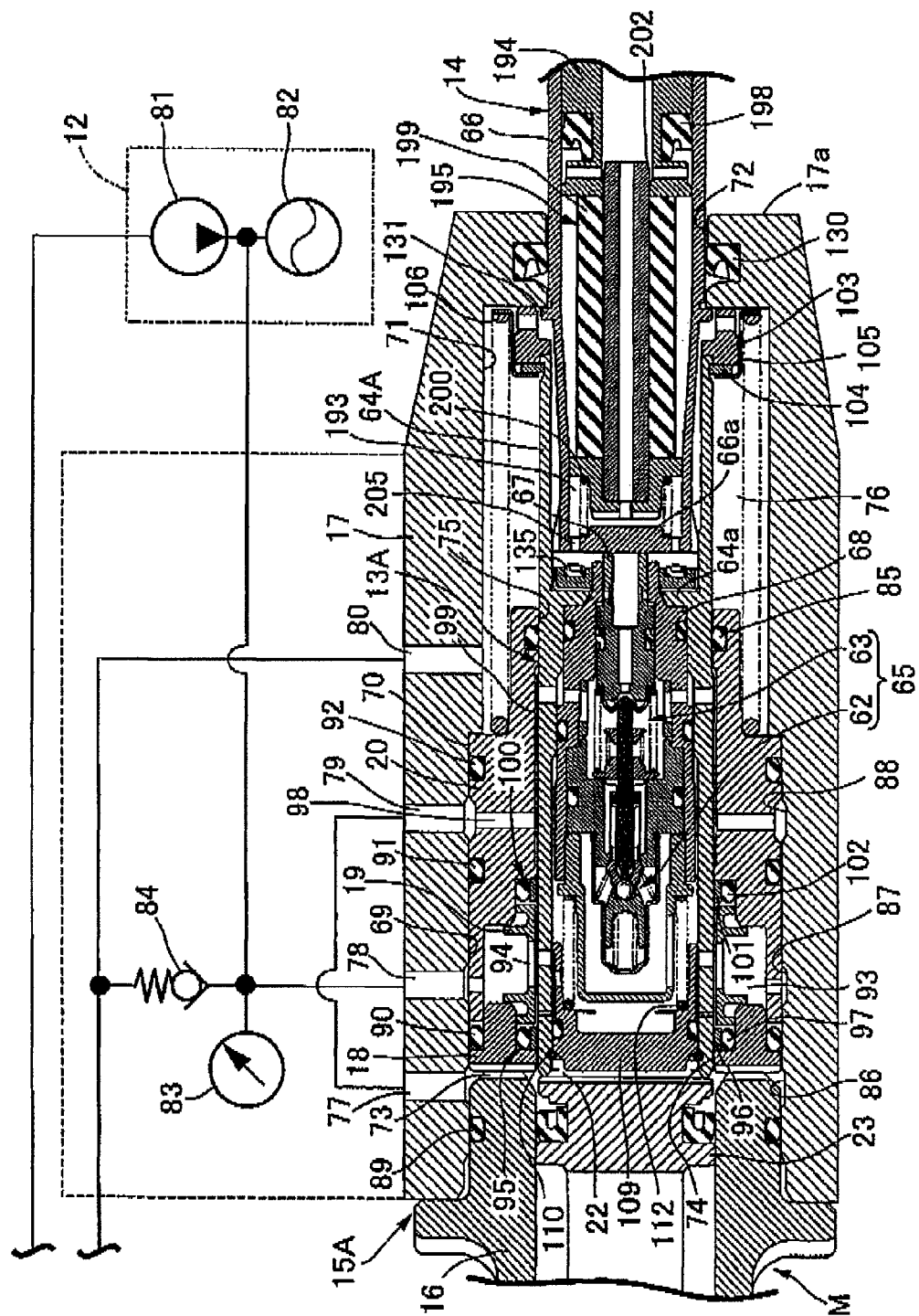
FIG. 2 is a vertical sectional view showing a hydraulic pressure booster and a stroke simulator.
Figure 3:
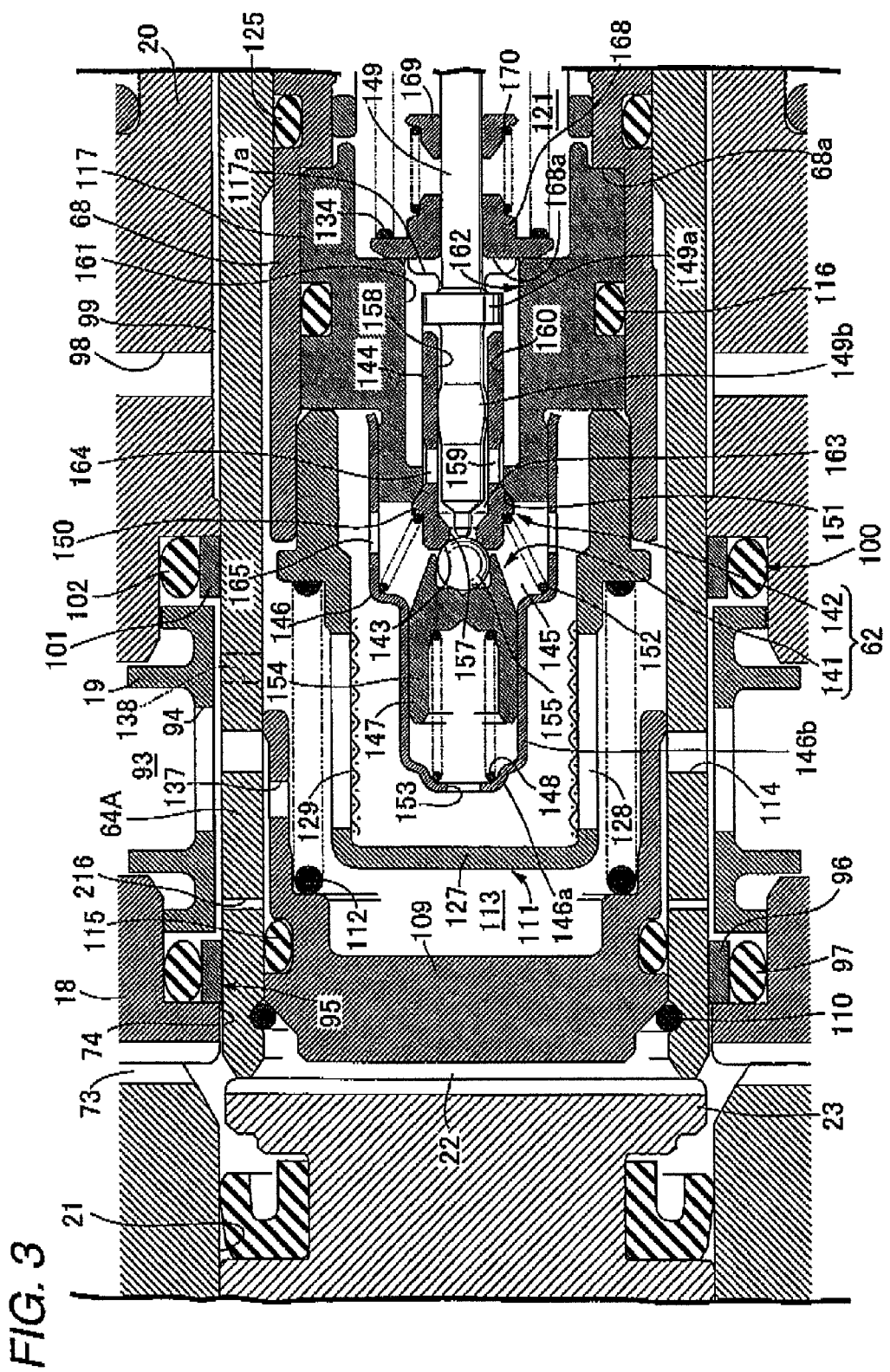
FIG. 3 is an enlarged vertical sectional view showing a booster valve serving as a part of the hydraulic pressure booster and its surrounding area in its closed state.
Figure 4:
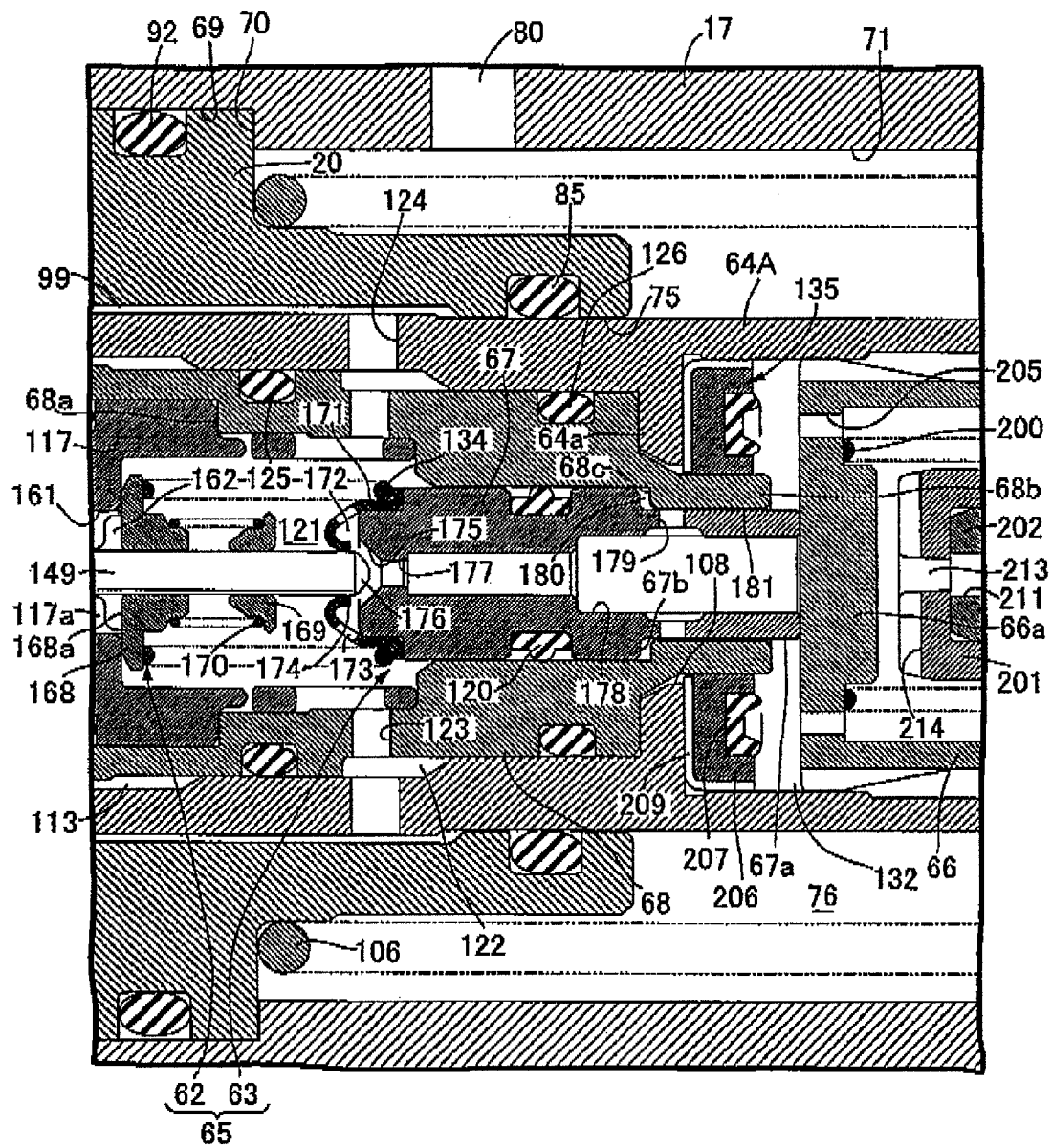
FIG. 4 is an enlarged vertical sectional view showing a pressure decreasing valve serving as a part of the hydraulic pressure booster and its surrounding area in its open state.
Figure 5:
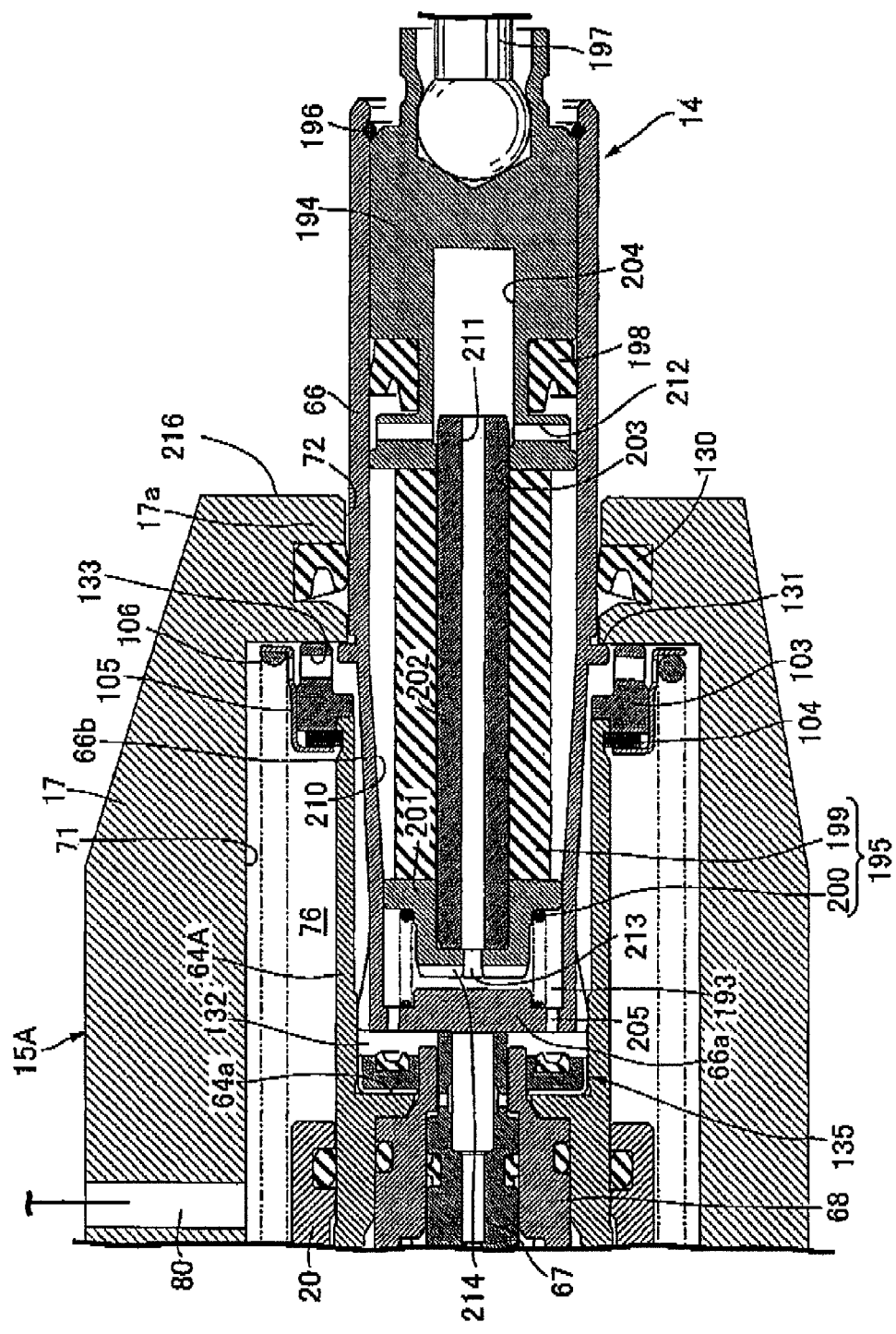
FIG. 5 is an enlarged vertical sectional view showing the stroke simulator.
Figure 6:
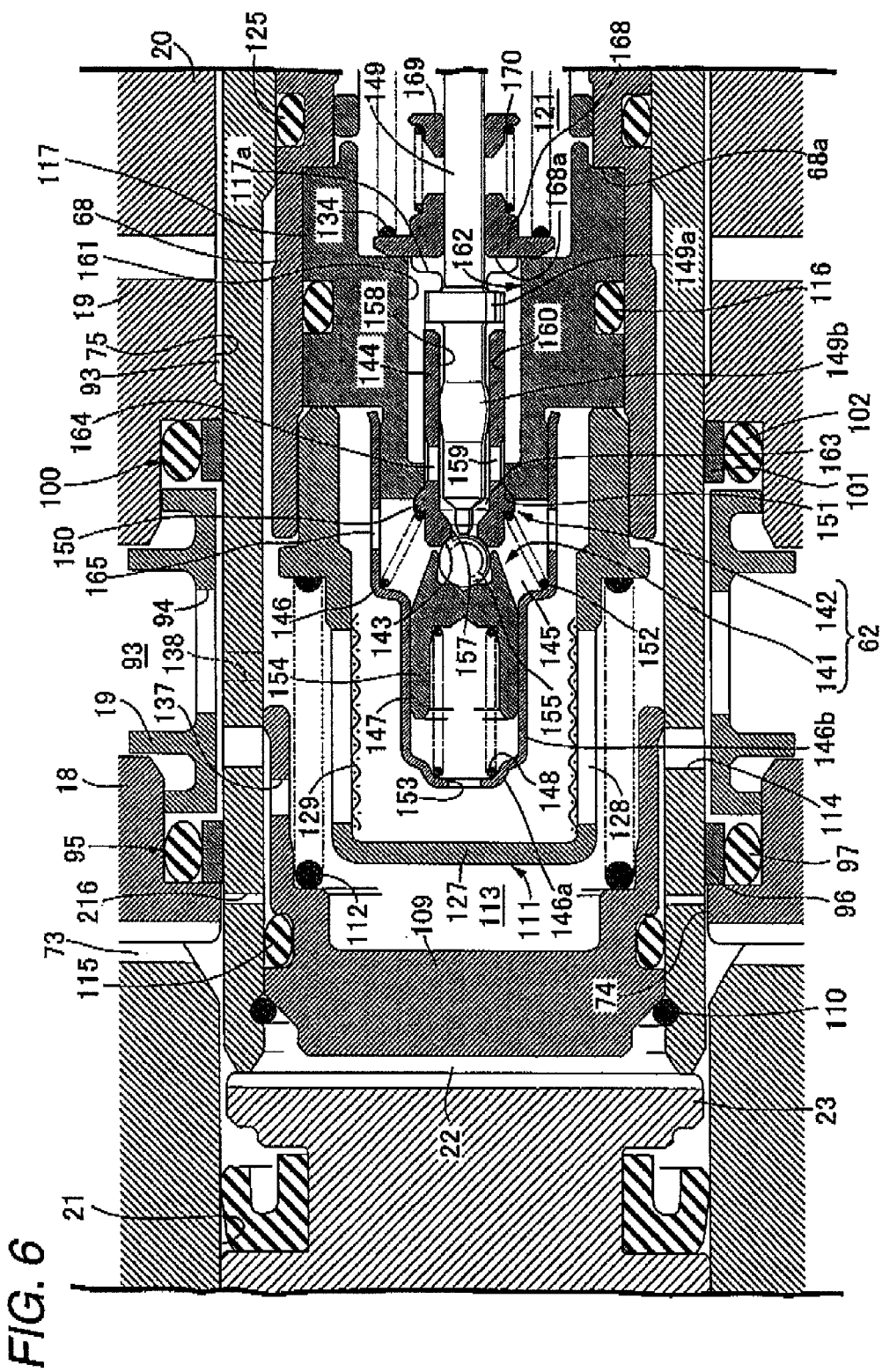
FIG. 6 is a vertical sectional view corresponding to FIG. 3, showing a backup piston moved forward.

FIGS. 1 to 6 show a first embodiment according to the present invention. FIG. 1 is a brake hydraulic pressure system diagram showing the entire configuration of a vehicular brake apparatus; FIG. 2 is a vertical sectional view showing a hydraulic pressure booster and a stroke simulator; FIG. 3 is an enlarged vertical sectional view showing a booster valve serving as a part of the hydraulic pressure booster and its surrounding area in its closed state; FIG. 4 is an enlarged vertical sectional view showing a pressure decreasing valve serving as a part of the hydraulic pressure booster and its surrounding area in its open state; FIG. 5 is an enlarged vertical sectional view showing the stroke simulator; and FIG. 6 is a vertical sectional view corresponding to FIG. 3, showing a backup piston moved forward.

In FIG. 1, a braking apparatus for four-wheel vehicles has a tandem type master cylinder M; a hydraulic pressure booster 13A for adjusting hydraulic pressure of a hydraulic pressure source 12 depending on braking operation force input from a brake pedal 11 serving as a braking operation member and for applying the hydraulic pressure to the master cylinder M; and a stroke simulator 14 provided between the brake pedal 11 and the hydraulic pressure booster 13A.

A casing 15A commonly housing both the master cylinder M and the hydraulic pressure booster 13A has: a cylindrical member 16 having a bottomed cylindrical shape and closed at its front end; a body 17 formed into a cylindrical shape having an inward flange section 17a at its rear end and coaxially connected to the rear section of the cylindrical member 16; a ring member 18 held between the rear end of the cylindrical member 16 and the body 17; a separator 19; and a sleeve 20.

The rear end of the cylindrical member 16 is fluid-tightly fitted into the front section of the body 17. The ring member 18 is fluid-tightly fitted into the body 17 and made contact with the rear end of the cylindrical member 16. The sleeve 20 is fitted into the front section of the body 17 so that its retraction limit is restricted by using an annular step section 70 provided in the intermediate section of the body 17 around its inner circumference. The separator 19 is held between the ring member 18 and the sleeve 20.

A first cylinder hole 21 being closed at its front end is formed in the cylindrical member 16. The rear face of the master cylinder M faces a boosted hydraulic pressure application chamber 22, and a rear master piston 23 biased backward is slidably fitted into the first cylinder hole 21. A front master piston 24 disposed ahead of the rear master piston 23 while being biased backward by is slidably fitted into the first cylinder hole 21. A rear output hydraulic pressure chamber 25 is formed between the rear master piston 23 and the front master piston 24, and a front output hydraulic pressure chamber 26 is formed between the front closed section of the cylindrical member 16 and the front master piston 24.

The cylindrical member 16 has a rear output port 27 communicating with the rear output hydraulic pressure chamber 25 and a front output port 28 communicating with the front output hydraulic pressure chamber 26. Furthermore, inside the rear output hydraulic pressure chamber 25, a rear return spring 29 for biasing the rear master piston 23 backward is disposed between the rear master piston 23 and the front master piston 24 in a compressed state. Inside the front output hydraulic pressure chamber 26, a front return spring 30 for biasing the front master piston 24 backward is disposed between the front closed end of the cylindrical member 16 and the front master piston 24 in a compressed state.

The master cylinder M has a reservoir 31, and this reservoir 31 is formed so as to be partitioned into first, second and third fluid reservoir chambers 31a, 31b and 31c. Hence, a rear connection cylinder section 32 having a cylindrical shape and communicating with the second fluid reservoir chamber 31b and a front connection cylinder section 33 having a cylindrical shape and communicating with the first fluid reservoir chamber 31a are provided so as to be integrated with the cylindrical member 16 while protruding upward at positions spaced in the direction of the axial line of the first cylinder hole 21.

A rear replenishing fluid chamber 36 communicating with the interior of the rear connection cylinder section 32 is formed into a ring shape between the outer circumference of the rear master piston 23 and the inner face of the first cylinder hole 21, and the brake fluid replenished from the second fluid reservoir chamber 31b of the reservoir 31 is supplied to the rear replenishing fluid chamber 36. In addition a front replenishing fluid chamber 37 communicating with the interior of the front connection cylinder section 33 is formed into a ring shape between the outer circumference of the front master piston 24 and the inner face of the first cylinder hole 21, and the brake fluid replenished from the first fluid reservoir chamber 31a of the reservoir 31 is supplied to the front replenishing fluid chamber 37.

The rear master piston 23 has a conventionally known center valve 38 for establishing communication between the rear output hydraulic pressure chamber 25 and the rear replenishing fluid chamber 36 when the rear master piston 23 has returned to its retraction limit position. The front master piston 24 also has a conventionally known center valve 39 for establishing communication between the front output hydraulic pressure chamber 26 and the front replenishing fluid chamber 37 when the front master piston 24 has returned to its retraction limit position.

In other words, the master cylinder M is configured as a center valve type in which the rear master piston 23 and the front master piston 24 have the center valves 38 and 39 that operate to open so as to replenish the brake fluid from the reservoir 31 to the rear and front output hydraulic pressure chambers 25 and 26 when the master pistons 23 and 24 retract. Furthermore, between the rear and front master pistons 23 and 24, a maximum distance regulator 40 for regulating the maximum distance between the master pistons 23 and 24 is provided.

The rear output port 27 of the master cylinder M is connected to a right front wheel brake B1 and a left rear wheel brake B2 via a hydraulic pressure modulator 41, and the front output port 28 is connected to a left front wheel brake B3 and a right rear wheel brake B4 via the hydraulic pressure modulator 41. The hydraulic pressure modulator 41 is a conventionally known device that controls the brake hydraulic pressure output from the rear and front output ports 27 and 28 as desired to carry out antilock brake control at the time of braking operation and to carry out automatic brake control, such as traction control, in a non-braking operation state.

In FIG. 2, the hydraulic pressure booster 13A has:
a cylindrical backup piston 64A accommodated in the casing 15A while its front end faces the boosted hydraulic pressure application chamber 22;
a pressure regulator 65 containing a pressure increasing valve 62 and a pressure decreasing valve 63 and built into the backup piston 64A;
a control piston 66 operating to balance the reaction force due to the hydraulic pressure of the boosted hydraulic pressure application chamber 22 with the braking operation input from the brake pedal 11 and to enable the pressure regulator 65 to perform pressure adjustment;
a first reaction force piston 67 disposed between the pressure regulator 65 and the control piston 66 so as to exert the reaction force due to the hydraulic pressure of the boosted hydraulic pressure application chamber 22 to the control piston 66; and
a second reaction force piston 68 disposed between the backup piston 64A and the first reaction force piston 67 so as to exert the output hydraulic pressure of the hydraulic pressure source 12 and the reaction force from a reaction spring 112 in addition to the reaction force from the first reaction force piston 67 to the control piston 66 when the braking operation input from the brake pedal 11 has increased.

The body 17 constitutes a part of the casing 15A and is coaxially connected to the rear section of the cylindrical member 16. The body 17 has:
a diameter hole 69 into which the rear end of the cylindrical member 16, the ring member 18, the separator 19 and the sleeve 20 are fitted from the front end side thereof; and
an intermediate diameter hole 71 having a diameter smaller than that of the large diameter hole 69 and coaxially connected to the rear end of the large diameter hole 69 while forming the annular step section 70 between the rear end of the large diameter hole 69 and the intermediate diameter hole 71.

The inward flange section 17a provided at the rear end of the body 17 has a small diameter hole 72 having a diameter smaller than that of the intermediate diameter hole 71 and formed so as to define the rear end of the intermediate diameter hole 71.

The ring member 18 is formed into a ring shape so as to from a second cylinder hole 74 having a diameter slightly smaller than that of the first cylinder hole 21 of the cylindrical member 16 of the master cylinder M in the inner circumference thereof. The sleeve 20 is formed into a cylindrical shape so as to form a third cylinder hole 75 having the same diameter as that of the second cylinder hole 74. Hence, the ring member 18 and the sleeve 20, between which the separator 19 is held, are fluid-tightly fitted into the large diameter hole 69 so as to be held between the rear end of the cylindrical member 16 and the step section 70, and the backup piston 64A is slidably fitted into the second and third cylinder holes 74 and 75.

The body 17 has:
a connection port 77 opened in an inner face of the large diameter hole 69 at the corresponding position between the cylindrical member 16 of the master cylinder M and the ring member 18;
an input port 78 opened in the inner face of the large diameter hole 69 at the corresponding position between the ring member 18 and the sleeve 20;
an output port 79 opened in the inner face of the large diameter hole 69 in the intermediate section of the sleeve 20 in the axial direction thereof and connected to the connection port 77; and
a release port 80 opened in a front inner face of the intermediate diameter hole 71. These ports are arranged in this order from the front and spaced apart.

The release port 80 is connected to the third fluid reservoir chamber 31c of the reservoir 31.

The hydraulic pressure source 12 is connected to the input port 78. The hydraulic pressure source 12 has: a pump 81 for pumping the brake fluid from the third fluid reservoir chamber 31c of the reservoir 31; an accumulator 82 connected to a discharge side of the pump 81; and a hydraulic pressure sensor 83 for detecting the hydraulic pressure of the accumulator 82 and for controlling the operation of the pump 81. The hydraulic pressure source 12 can output a high constant hydraulic pressure regardless of the operation of the brake pedal 11, and the hydraulic pressure output from the hydraulic pressure source 12 is supplied to the input port 78. In addition, a relief valve 84 is provided between the discharge side of the hydraulic pressure source 12 and the third fluid reservoir chamber 31c of the reservoir 31. The hydraulic pressure passage for connecting the input port 78 to the connection port 77 and the relief valve 84 are disposed on the body 17 of the casing 15A. The hydraulic pressure sensor 83 is also disposed on the body 17.

The inner face of the large diameter hole 69 in the body 17 has an annular concave section 86 for allowing the inner end of the connection port 77 to open; an annular concave section 87 for allowing the inner end of the input port 78 to open; and an annular concave section 88 for allowing the inner end of the output port 79 to open. A path 73 for establishing communication between the annular concave section 86 and the boosted hydraulic pressure application chamber 22 is formed between the rear end of the cylindrical member 16 and the front end of the body 17.

The annular concave section 86 is sealed with O-rings 89 and 90 on both sides thereof the annular concave section 87 is sealed with O-rings 90 and 91 on both sides thereof, and the annular concave section 87 is sealed with O-rings 91 and 92 on both sides thereof.

The O-ring 89 is mounted on the outer circumference of the cylindrical member 16 of the master cylinder M. The O-ring 90 is mounted on the outer circumference of the ring member 18. The O-rings 91 and 92 are mounted on the outer circumference of the sleeve 20. In other words, the O-rings 89 and 90 for sealing the annular concave section 86 on both sides thereof are mounted on the outer circumferences of the cylindrical member 16 and the ring member 18 so as to elastically make contact with the inner face of the large diameter hole 69; the O-ring 91 is mounted on the outer circumference of the sleeve 20 so as to elastically make contact with the inner face of the large diameter hole 69 while the annular concave section 87 is located between the O-rings 90 and 91; and the O-ring 92 is mounted on the outer circumference of the sleeve 20 so as to elastically make contact with the inner face of the large diameter hole 69 while the annular concave section 88 is located between the O-rings 91 and 92.

The front section of the backup piston 64A is fitted into the second cylinder hole 74 of the ring member 18 fluid-tightly and slidably, and the intermediate section of the backup piston 64A is fitted into the third cylinder hole 75 of the sleeve 20 fluid-tightly and slidably. In addition, the separator 19 held between the ring member 18 and the sleeve 20 has an inner circumference diameter larger than the diameters of the second and third cylinder holes 74 and 75 and coaxially surrounds the backup piston 64A. An input-side annular chamber 93 communicating with the annular concave section 87 provided in the inner face of the large diameter hole 69 of the body 17 and leading to the hydraulic pressure source 12 is formed between the ring member 18 and the body 17 of the casing 15A and the outer circumference of the backup piston 64A in the region where the separator 19 is disposed. The separator 19 disposed inside the input-side annular chamber 93 has multiple communication holes 94 so as not to divide the input-side annular chamber 93.

Referring to FIG. 3, sealing is established between the boosted hydraulic pressure application chamber 22 and the input-side annular chamber 93 using an annular sealing member 95 disposed between the ring member 18 and the backup piston 64A of the casing 15A and provided on the side of the ring member 18. This sealing member 95 contains an annular seal ring 96 making slide contact with the outer circumference of the backup piston 64A and an O-ring 97 mounted on the outer circumference of the seal ring 96 and is provided on the inner circumference side of the ring member 18 so that the axial position thereof is restricted by the separator 19 and the ring member 18.

Referring to FIG. 4, an output-side annular chamber 99 communicating with the annular concave section 88 via a passage 98 provided in the sleeve 20 is formed between the inner circumference of the sleeve 20 and the backup piston 64A. A sealing member 100 for establishing sealing between the output-side annular chamber 99 and the input-side annular chamber 93 is disposed between the sleeve 20 and the backup piston 64A. This sealing member 100 contains a seal ring 101 making slide contact with the outer circumference of the backup piston 64A and an O-ring 102 mounted on the outer circumference of the seal ring 101 and is mounted on the inner circumference of the sleeve 20 so that the axial position thereof is restricted by the separator 19 and the sleeve 20.

Referring to FIG. 5, an annular stopper 103 is made contact with the inward flange section 17a of the body 17. A coil spring 106 surrounding the rear half of the backup piston 64A is provided in a compressed state between the sleeve 20 and a retainer 105. A front side of the inner circumference of the retainer 105 is made contact with and engaged with a retaining ring 104 mounted on the outer circumference of the rear end section of the backup piston 64A. The backup piston 64A is biased backward by the spring force of this spring 106. Hence, the position where the retaining ring 104 is made contact with the stopper 103 contacted with the inward flange section 17a of the body 17 is defined as the retraction limit of the backup piston 64A. The front end of the backup piston 64A located at the retraction limit faces the boosted hydraulic pressure application chamber 22 and makes contact with the entire circumference of the outer circumferential fringe section on the rear face of the rear master piston 23 being in its non-operation state, and the rear master piston 23 being in this state is also located at its retraction limit.

A release chamber 76 surrounding the backup piston 64A is formed between the sleeve 20 and the inward flange section 17a inside the body 17 so as to accommodate the spring 106. This release chamber 76 communicates with the release port 80. Furthermore, sealing between the release chamber 76 and the annular concave section 88 communicating with the output port 79 is established by using the O-ring 92 mounted on the outer circumference of the sleeve 20. Sealing between the release chamber 76 and the output-side annular chamber 99 is established by using an O-ring 85 mounted on the inner circumference of the sleeve 20.

An inward flange section 64a extending inward in the radial direction is integrally provided on the inner face of the axial intermediate section of the backup piston 64A. The second reaction piston 68 having a stepped cylindrical shape is slidably fitted into the backup piston 64A ahead of the inward flange section 64a. The first reaction force piston 67 is fitted into the second reaction force piston 68 so as to be coaxial and mutually slidable.

As shown in FIG. 3, an end wall member 109, the front face of which faces the boosted hydraulic pressure application chamber 22, is fluid-tightly fitted into the front end section of the backup piston 64A. A retaining ring 110 contacting with and engaging with the outer circumferential fringe section of this end wall member 109 from the front side is mounted on the inner circumference of the front end section of the backup piston 64A. Furthermore, the rear section of a filter frame 127 formed into a bottomed cylindrical shape and having multiple openings 128 in the circumferential direction thereof is press-fitted into the front end of the second reaction force piston 68. A mesh member 129 is provided on the inner face of the filter frame 127 to form a filter 111. The second reaction force piston 68 is biased from the front side to the side making contact with the inward flange section 64a by the spring force of the reaction spring 112 disposed between the filter 111 and the end wall member 109 in a compressed state.

An input chamber 113 is formed inside the backup piston 64A between the end wall member 109 and the second reaction force piston 68 and the filter 111. This input chamber 113 communicates with the input-side annular chamber 93 via communication hole 114 provided in the backup piston 64A and via a communication hole 137 provided in the end wall member 109. In other words, the high-pressure brake fluid from the hydraulic pressure source 12 is introduced to the input chamber 113. An O-ring 115 is mounted on the outer circumference of the end wall member 109 so as to elastically make contact with the inner circumference of the backup piston 64A and to establish sealing between the input chamber 113 and the boosted hydraulic pressure application chamber 22. Instead of the communication hole 114 in the backup piston 64A and the communication hole 137 in the end wall member 109, a communication hole 138 indicated by dashed lines in FIG. 3 may also be provided in the backup piston 64A behind the end wall member 109 so as to allow the input-side annular chamber 93 to directly communicate with the input chamber 113.

An annular step section 68a facing forward is provided on the inner face of the intermediate section of the second reaction force piston 68. A valve seat member 117 having a stepped cylindrical shape and having, on the outer circumference thereof, an O-ring 116 elastically making contact with the inner circumference of the second reaction force piston 68 is fitted into the front section of the second reaction force piston 68 so as to make contact with the step section 68a. The valve seat member 117 is thus held between the step section 68a and the rear end of the filter frame 127 that is press-fitted into the front end of the second reaction force piston 68.

Hence, the valve seat member 117 is fluid-tightly fitted into the front section of the second reaction force piston 68 and fixed thereto, thereby being supported by the backup piston 64A via the second reaction force piston 68.

On the other hand, as shown in FIG. 4, the first reaction force piston 67 has an annular sealing member 120 elastically making contact with the rear inner circumference of the second reaction force piston 68 on the outer circumference thereof and is slidably fitted into the rear section of the second reaction force piston 68. A boosted hydraulic pressure generation chamber 121 facing the rear face of the valve seat member 117 and facing the front end of the first reaction force piston 67 is formed inside the second reaction force piston 68. Furthermore, an annular chamber 122 is formed between the outer circumference of the second reaction force piston 68 and the inner circumference of the backup piston 64A. The boosted hydraulic pressure generation chamber 121 is allowed to communicate with the annular chamber 122 via a communication hole 123 provided in the second reaction force piston 68. Moreover, a communication hole 124 for allowing the annular chamber 122 to communicate with the output-side annular chamber 99 is provided in the intermediate section of the backup piston 64A. The boosted hydraulic pressure generation chamber 121 communicates with the output port 79 via the communication hole 123, the annular chamber 122, the communication hole 124, the output-side annular chamber 99, the passage 98 and the annular concave section 88. Still further, O-rings 125 and 126 disposed ahead of and behind the annular chamber 122 are mounted on the outer circumference of the second reaction force piston 68 so as to elastically make contact with the inner circumference of the backup piston 64A.

The control piston 66 is formed into a bottomed cylindrical shape having an end wall 66a at its front end. The control piston 66 is slidably fitted into the small diameter hole 72 formed in the inward flange section 17a at the rear end of the body 17 and coaxially inserted into the rear section of the backup piston 64A. In addition, an annular sealing member 130 elastically making contact with the outer circumference of the control piston 66 is mounted on the inner circumference of the inward flange section 17a, i.e., the inner face of the small diameter hole 72. A restricting protrusion 131 for restricting the retraction limit of the control piston 66 by making contact with and engaging with the inner circumferential fringe section of the inward flange section 17a from the front side is integrally provided so as to protrude around the entire circumference of the outer face of the control piston 66.

A release chamber 132 is formed between the backup piston 64A and the control piston 66 behind the inward flange section 64a. This release chamber 132 communicates with the release chamber 76 via a communication hole 133 provided in the stopper 103. In other words, the release chamber 132 communicates with the third fluid reservoir chamber 31c of the reservoir 31 via the communication hole 133, the release chamber 76 and the release port 80.

An extension cylinder section 67a extending backward and passing through an insertion hole 181 is integrally provided coaxially on the first reaction force piston 67. The rear end of this extension cylinder section 67a is made contact with the end wall 66a at the front end of the control piston 66 at all times. In addition, a spring 134 for exerting biasing spring force so that the rear end of first reaction force piston 67, i.e., the rear end of the extension cylinder section 67a, is made contact with the end wall 66a of the control piston 66 is accommodated in the boosted hydraulic pressure generation chamber 121. The spring force of this spring 134 is set very low.

Furthermore, an extension cylinder section 68b coaxially surrounding the extension cylinder section 67a of the first reaction force piston 67 and inserted into an insertion hole 108 formed in the inward flange section 64a is integrally provided coaxially on the second reaction force piston 68. In a state in which the second reaction force piston 68 makes contact with the inward flange section 64a of the backup piston 64A and is located at the retraction limit position, the rear end of the extension cylinder section 68b of the second reaction force piston 68 is disposed ahead of the rear end of the extension cylinder section 67a of the first reaction force piston 67 although located behind a seat stopper 135 that makes contact with the inward flange section 64a of the backup piston 64A and is secured to the backup piston 64A.

Hence, when the control piston 66 moves forward with respect to the backup piston 64A, the first reaction force piston 67 moves forward together with the control piston 66. The rear end of the second reaction force piston 68 makes contact with the end wall 66a at the front end of the control piston 66 when the braking operation input from the brake pedal 11 has increased and the forward movement amount of the control piston 66 has reached a threshold value or more.

Referring to FIG. 3 again, the pressure increasing valve 62 contains first and second valve units 141 and 142 arranged in the axial direction of the control piston 66 so as to open sequentially as the braking operation input from the brake pedal 11 increases. The sealing diameter of the second valve unit 142 is set larger than the sealing diameter of the first valve unit 141, and the second valve unit 142 is configured so as to start to open before the flow rate from the first valve unit 141 having opened becomes maximal.

The first valve unit 141 has: a cylindrical sliding member 144 having a first valve seat 143 at its front end; a retainer 146 in which a valve chamber 145 communicating with the input chamber 113 leading to the hydraulic pressure source 12 is formed; a valve body 147 slidably fitted into the retainer 146 so as to be capable of being seated on the first valve seat 143 facing the interior of the valve chamber 145; a first valve spring 148 provided between the retainer 146 and the valve body 147 so as to bias the valve body 147 to seat the valve body 147 on the first valve seat 143; and a pushrod 149 interlockingly connected to the control piston 66 so as to be able to make contact with the valve body 147 and inserted into the sliding member 144 so as to be movable in the axial direction.

Furthermore, the second valve unit 142 has a valve section 150 provided on the sliding member 144 which is a common component of the first valve unit 141; the stepped cylindrical valve seat member 117, into which the sliding member 144 is slidably fitted and at the front end of which a second valve seat 151 is provided; the retainer 146 which is a common component of the first valve unit 141; a second valve spring 152 provided between the retainer 146 and the sliding member 144 so as to bias the valve section 150 to seat the valve section 150 on the second valve seat 151; and the pushrod 149 which is a common component of the first valve unit 141.

The retainer 146 is installed on the outer circumference of the front end section of the valve seat member 117 by press fitting. The valve chamber 145 facing the first valve seat 143 at the front end of the sliding member 144 and the second valve seat 151 at the front end of the valve seat member 117 is formed inside the retainer 146. Multiple communication holes 165 for allowing the input chamber 113 leading to the hydraulic pressure source 12 to communicate with the valve chamber 145 are provided in the side wall of the retainer 146.

A guide cylinder section 146b formed into a bottomed cylindrical shape and having an end wall 146a at its front end is integrally provided at the front section of the retainer 146. The end wall 146a has a release hole 153 communicating with the input chamber 113 at its central section. The valve body 147 of the first valve unit 141 contains a spherical body 155 fixed at the rear section of a sliding member 154 that is slidably fitted into the guide cylinder section 146b. The spherical body 155 can be seated on the first valve seat 143. In other words, the valve body 147 is slidably fitted into the retainer 146, and the first valve spring 148 is disposed between the end wall 146a and the sliding member 154 in a compressed state.

A first valve hole 157, the front end of which is open at the central section of the first valve seat 143, and a sliding hole 158 having a diameter larger than that of the first valve hole 157, communicating with the first valve hole 157 at its front end and opened at its rear end are coaxially provided in the sliding member 144. On the other hand, a second valve hole 159, the front end of which is open at the central section of the second valve seat 151, and a sliding hole 160 having the same diameter as that of the second valve hole 159, communicating with the second valve hole 159 at its front end and opened at its rear end are coaxially provided in the valve seat member 117. The sliding member 144 is movable along the second valve hole 159, passes through the second valve hole 159 coaxially and is slidably fitted into the sliding hole 160.

The pushrod 149 is slidably fitted into the sliding hole 158 of the sliding member 144 while the front end section thereof is disposed inside the first valve hole 157. Inside the valve seat member 117, the pushrod 149 is integrally provided with a pushing flange section 149a making contact with the rear end of the sliding member 144 and being capable of pushing and moving the sliding member 144 forward. A restricting flange section 117a is integrally provided on the valve seat member 117 so as to extend inward in the radial direction from the inner face of the rear section of the sliding hole 160. The restricting flange section 117a is intended to restrict the retraction limit of the pushrod 149 by making contact with the pushing flange section 149a from behind.

A sliding section 149b making slide contact with the inner face of the sliding hole 158 is provided on the pushrod 149 ahead of the pushing flange section 149a. On the front side of the sliding section 149b, the pushrod 149 is formed so as to be smaller in diameter so that an annular chamber 163 is formed between the pushrod 149 and the inner face of the sliding member 144.

Hence, when the valve body 147 is pushed by using the front end of the pushrod 149 and moved away from the first valve seat 143, the valve chamber 145 communicates with the annular chamber 163. In addition, when the pushing flange section 149a makes contact with the restricting flange section 117a, the distance between the front end of the pushrod 149 and the valve body 147 is smaller than the distance between the rear end of the sliding member 144 and the pushing flange section 149a. While the pushrod 149 is moved forward, when the pushrod 149 is further moved forward after the valve body 147 has been moved away from the first valve seat 143, the sliding member 144 is pushed forward by the pushing flange section 149a.

The valve section 150 of the second valve unit 142 is provided on the sliding member 144 behind the first valve seat 143 and can be seated on the second valve seat 151 while having a sealing diameter larger than the sealing diameter obtained when the valve body 147 is seated on the first valve seat 143. Hence, after the first valve unit 141 has opened, the pushrod 149 is moved forward further to push the sliding member 144 forward, whereby the valve section 150 is moved away from the second valve seat 151 and the second valve unit 142 opens.

Multiple flowing grooves 161, the rear ends of which are open at the rear end of the valve seat member 117, are provided in the inner face of the sliding hole 160 in the valve seat member 117. The sliding member 144 has multiple communication holes 164 for allowing the annular chamber 163 to communicate with the respective flowing grooves 161.

The sliding hole 160 and the multiple flowing grooves 161 in the valve seat member 117 are provided to form a flowpassage 162. When the first valve unit 141 is open, the operating fluid entered from the valve chamber 145 to the annular chamber 163 passes through the communication holes 164 and flows inside the flow passage 162 to the boosted hydraulic pressure generation chamber 121. When the second valve unit 142 is open, the operating fluid in the valve chamber 145 flows inside the flow passage 162 to the boosted hydraulic pressure generation chamber 121.

The rear section of the pushrod 149 is inserted into the boosted hydraulic pressure generation chamber 121. Inside the boosted hydraulic pressure generation chamber 121, the pushrod 149 is slidably fitted into the center section of a disc-shaped straightening member 168. When the straightening member 168 makes contact with the valve seat member 117, the contact face of which faces the boosted hydraulic pressure generation chamber 121, the opening end of the flow passage 162 to the boosted hydraulic pressure generation chamber 121 can be closed. The axial movement of the straightening member 168 is guided only by the pushrod 149. In addition, the face of the straightening member 168 facing the flow passage 162 is formed on the flat face 168a thereof.

Referring to FIG. 4, a spring receiving member 169 is press-fitted onto the pushrod 149 and fixed thereto behind the straightening member 168, and a spring 170 is provided between the straightening member 168 and the spring receiving member 169 in a compressed state. On the other hand, the front end of the first reaction force piston 67 is also inserted into the boosted hydraulic pressure generation chamber 121 coaxially with the pushrod 149. The spring 134 is provided between the straightening member 168 and a retainer 171 fitted onto and made contact with the front section of the first reaction force piston 67 in a compressed state. Hence, the straightening member 168 is biased toward the valve seat member 117 by the spring forces of the springs 134 and 170. The spring forces of the springs 134 and 170 are set to the extent that the straightening member 168 can move away from the valve seat member 117 when the hydraulic pressure from the hydraulic pressure source 12 is exerted to the flow passage 162 by opening the first valve unit 141.

The retainer 171 fitted onto the front section of the first reaction force piston 67 is provided to form a valve chamber 172 between the first reaction force piston 67 and the retainer 171. The retainer 171 has multiple communication holes 173 for establishing communication between the boosted hydraulic pressure generation chamber 121 and the valve chamber 172. In addition, a guide cylinder section 174 having a cylindrical shape is provided a the central section of the retainer 171. The rear end section of the pushrod 149 is slidably fitted into the guide cylinder section 174. Furthermore, a valve seat 175 facing the valve chamber 172 is provided at the front end of the first reaction force piston 67. At the rear end of the pushrod 149, a valve section 176 formed into a hemispherical shape is provided so that it can be seated on the valve seat 175.

The pressure decreasing valve 63 contains the valve seat 175 and the valve section 176 that can be seated on the valve seat 175. The first reaction force piston 67 is coaxially provided with a valve hole 177 opened at the central section of the valve seat 175 and a release passage 178 formed to have a diameter larger than that of the valve hole 177. The front end of the release passage 178 is allowed to communicate with the valve hole 177, and the release passage 178 extends to the rear end of the first reaction force piston 67. Since the end wall 66*a* at the front end of the control piston 66 makes contact with the rear end of the first reaction force piston 67 at all times, the rear end of the release passage 178 is closed substantially.

Multiple communication holes 179 for allowing the inner ends thereof to communicate with the release passage 178 are provided in the intermediate section of the first reaction force piston 67. When the pressure decreasing valve 63 is open, the operating fluid from the release passage 178 flows into the release chamber 132 via a primary reservoir chamber 180 and an orifice 181.

The primary reservoir chamber 180 is formed between the first and second reaction force pistons 67 and 68 and is formed into a ring shape so as to surround the first reaction force piston 67 between an annular step section 67*b* facing backward and provided on the outer circumference of the first reaction force piston 67 and an annular step section 68*c* facing forward and provided on the inner circumference of the second reaction force piston 68 so as to be opposed to the step section 67*b*. In addition, the communication holes 179 are provided in the first reaction force piston 67 so that the communication holes 179 are located at positions corresponding to the primary reservoir chamber 180 at least when the pressure decreasing valve 63 starts to open from its closed state.

The orifice 181 is formed between the outer circumference of the extension cylinder section 67*a* of the first reaction force piston 67 and the inner circumference of the extension cylinder section 68*b* of the second reaction force piston 68. The orifice 181 is formed by setting au annular clearance between the outer circumference of the extension cylinder section 67*a* and the inner circumference of the extension cylinder section 68*b* amounting to the tolerance thereof.

In the hydraulic pressure booster 13A configured as described above, the braking operation input from the brake pedal 11 is input to the control piston 66 via the stroke simulator 14, and pushing force is exerted forward from the control piston 66 to the first reaction force piston 67. Hence, when the forward movement amount of the control piston 66 with respect to the backup piston 64A is less than the threshold value, only the first reaction force piston 67 makes contact with the control piston 66. As the first reaction force piston 67 moves forward, the valve section 176 is seated on the valve seat 175, the pressure decreasing valve 63 is closed, and the communication between the boosted hydraulic pressure generation chamber 121 and the release chamber 132 is shut off, and the control piston 66, the first reaction force piston 67 and the pushrod 149 move further forward. In the pressure increasing valve 62, as the pushrod 149 moves forward, first, the valve body 147 moves away from the first valve seat 143 disposed at the front end of the sliding member 144 to open the first valve unit 141. Next, as the pushrod 149 moves further forward, the sliding member 144 is pushed by the pushrod 149, the valve section 150 moves away from the second valve seat 151 to open the second valve unit 142.

When the pressure decreasing valve 63 is in its closed state, the hydraulic pressure of the boosted hydraulic pressure generation chamber 121 is applied to the front end of the first reaction force piston 67. The first reaction force piston 67 and the control piston 66 move backward so that the braking operation input from the brake pedal 11 is balanced with the hydraulic pressure force due to the hydraulic pressure of the boosted hydraulic pressure generation chamber 121, whereby the pressure decreasing valve 63 opens and the pressure increasing valve 62 closes. The opening and closing operations of the pressure increasing valve 62 and the pressure decreasing valve 63 are repeated, whereby the output hydraulic pressure of the hydraulic pressure source 12 is adjusted to the boosted hydraulic pressure corresponding to the braking operation input from the brake pedal 11 and applied to the boosted hydraulic pressure generation chamber 121. If the movement amount of the control piston 66 with respect to the backup piston 64A in the forward direction becomes the threshold value or more, not only the first reaction force piston 67 but also the second reaction force piston 68 makes contact with the control piston 66, and the hydraulic pressure force for pushing the second reaction force piston 68 backward by virtue of the hydraulic pressure of the input chamber 113 and the spring force of the reaction spring 112 are also applied as a reaction force. As a result, the reaction force exerted to the control piston 66 increases.

Referring to FIG. 5, the stroke simulator 14 has a simulator piston 194 fluid-tightly fitted into the control piston 66 so as to be slidable in the axial direction while forming a stroke fluid chamber 193 between the simulator piston 194 and the end wall 66*a* at the front end of the control piston 66; and an elastic member 195 accommodated in the stroke fluid chamber 193 so as to be disposed between the simulator piston 194 and the end wall 66*a* of the control piston 66. The stroke simulator 14 is built into the control piston 66.

The simulator piston 194 is slidably fitted into the rear section of the control piston 66 so that the retraction limit position thereof is restricted by using a retaining ring 196 mounted on the rear end section of the control piston 66, and the front end section of an input rod 197 serving as an input member connected to the brake pedal 11 is swingably connected to the simulator piston 194. In other words, the braking operation force in response to the operation of the brake pedal 11 is input to the simulator piston 194 via the input rod 197, and the simulator piston 194 moves forward in response to the input of the braking operation force. In addition, an annular sealing member 198 making slide contact with the inner circumference of the control piston 66 is mounted on the outer circumference of the simulator piston 194.

The elastic member 195 contains an elastic member 199 made of an elastic material, such as rubber, and formed into a cylindrical shape and a coil spring 200 made of metal and having a spring load being set smaller than the load of the elastic member 199, and the elastic member 199 and the coil spring 200 are connected in series via a sliding member 201 slidably accommodated in the control piston 66. The elastic member 199 is disposed between the sliding member 201 and the simulator piston 194, and the coil spring 200 is disposed between the end wall 66*a* at the front end of the control piston 66 and the sliding member 201.

Furthermore, the elastic member 199 and the coil spring 200 are disposed in series between the simulator piston 194 and the control piston 66, wherein, in the initial stage of the braking operation of the brake pedal 11, the spring force exerted from the coil spring 200 is applied to the control piston 66, and the action of the spring force of the coil spring 200 to the control piston 66 is completed when the sliding member 201 makes contact with the end wall 66*a* at the front end of the control piston 66, and then the elastic deformation of the elastic member 199 starts.

Moreover, the load set to the coil spring 200 is set so as to deliver a spring force in the front-back direction and to be smaller than the load set to another spring member connected in series with the coil spring 200. In this embodiment, the load set to the coil spring 200 is set smaller than that of the spring 134 that is accommodated in the boosted hydraulic pressure generation chamber 121 and connected in series with the coil spring 200 via the first reaction force piston 67 and the end wall 66a of the control piston 66.

The front end section of a guide shaft 202 provided coaxially with the control piston 66 and passing through the elastic member 199 is press-fitted into the central section of the sliding member 201, and the rear end section of this guide shaft 202 is slidably fitted into the simulator piston 194. In other words, a sliding hole 203 into which the rear end section of the guide shaft 202 is slidably fitted and a bottomed hole 204 which has a diameter larger than that of the sliding hole 203, the front end of which is connected to the rear section of the sliding hole 203 and the rear end of which is closed, are provided coaxially at the central section of the simulator piston 194. The rear end section of the guide shaft 202 is inserted into the bottomed hole 204 as the simulator piston 194 moves forward relatively with respect to the guide shaft 202.

In the end wall 66a at the front end of the control piston 66, multiple openings 205 for allowing the release chamber 132 facing the front end of the end wall 66a to communicate with the stroke fluid chamber 193 are provided at the same distance from the center of the control piston 66. Thus, the stroke fluid chamber 193 inside the control piston 66 communicates with the release chamber 132 when the openings 205 are open.

When the control piston 66 has moved forward by a predetermined forward stroke or more, the openings 205 are closed by the seat stopper 135 fixed to the backup piston 64A. The seat stopper 135 has a retainer 206, the outer circumference of which is press-fitted into the inner circumference of the backup piston 64A so that the retainer 206 is fixed to the backup piston 64A so as to make contact with the inward flange section 64a, and an elastic sealing member 207 retained in the retainer 206.

The retainer 206 is made of a material having rigidity, such as metal, and formed into a ring shape. The retainer 206 is press-fitted into the backup piston 64A so that a minute annular clearance is formed between the retainer 206 and the extension cylinder section 68b of the second reaction force piston 68.

The elastic sealing member 207 is formed so as to make contact with the front face of the end wall 66a on the inner and outer sides of the openings 205 of the control piston 66 in the radial direction thereof and to close the openings 205 and is baked to be bonded to the retainer 206.

In addition, on the rear face of the retainer 206, a communication groove 209 for allowing the inward side of the retainer 206 to communicate with the outside section of the control piston 66 in the release chamber 132 is provided in a state in which the end wall 66a of the control piston 66 makes contact with the elastic sealing member 207.

In other words, in the state in which the end wall 66a of the control piston 66 has made contact with the elastic sealing member 207, the extension cylinder section 68b of the second reaction force piston 68 also makes contact with the end wall 66a. Hence, the space between the retainer 206 and the extension cylinder section 68b communicates with the outside portion of the control piston 66 in the release chamber 132 via the minute clearance and the communication groove 209. In the state in which the end wall 66a of the control piston 66 makes contact with the elastic sealing member 207, the pressure in the space located inward from the elastic sealing member 207 and faced by the rear section of the retainer 206 does not become negative but is maintained at atmospheric pressure as the control piston 66 moves backward.

Referring to FIG. 5 again, the control piston 66 is formed into a bottomed cylindrical shape having a tapered face 210, a part of the inner circumferential face of which has a diameter becoming smaller forward on the front side from the simulator piston 194. In this embodiment, the front half portion of the control piston 66 is formed as a tapered cylinder section 66b, the inner circumferential face of which serves as the tapered face 210.

The sliding member 201 is slidably accommodated inside the control piston 66 on lie front side from the tapered face 210. In addition, the elastic member 199 disposed between the sliding member 201 and the simulator piston 194 is formed into a cylindrical shape. The elastic member 199 is elastically deformed by the action of the axial compression force exerted as the simulator piston 194 moves forward, and the deformation is stopped in succession beginning with the front section by the restriction due to the effect of the tapered face 210 as the axial compression force increases. When no load is applied, the elastic member 199 has a cylindrical shape having the same outside diameter along its entire length in the axial direction.

The guide shaft 202, the rear end section of which is fitted into and supported by the simulator piston 194, is formed into a cylindrical shape while coaxially having a release passage 211 extending along its entire length in the axial direction. In the front section of the simulator piston 194, ahead of the portion on which the sealing member 198 is mounted, multiple passages 212, the inner ends of which are open to the bottomed hole 204 communicating with the release passage 211, are provided along the radial direction of the simulator piston 194. Hence, the passages 212 and the bottomed hole 204 allow the space between the elastic member 199 and the control piston 66 in the stroke fluid chamber 193 to communicate with the release passage 211 of the guide shaft 202.

In addition, the sliding member 201 has a release passage 213 coaxially communicating with the front end of the release passage 211. Furthermore, in the front end face of the sliding member 201, multiple grooves 214 are provided along the radial direction to prevent the release passage 213 from being clogged by the end wall 66a when the sliding member 201 makes contact with the end wall 66a at the front end of the control piston 66.

With this configuration, until the openings 205 are closed by the seat stopper 135 and the stroke fluid chamber 193 becomes a hydraulic pressure locking state while the control piston 66 moves forward, the space between the elastic member 199 and the control piston 66 inside the control piston 66 communicates with the release chamber 132 via the passages 212, the bottomed hole 204, the release passages 211 and 213, the grooves 214 and the openings 205. In other words, the space between the elastic member 199 and the control piston 66 is allowed to communicate with the release chamber 132, i.e., the reservoir 31, in the forward stroke of the control piston 66 until the operating fluid is tightly sealed inside the control piston 66.

As shown in FIG. 3, a communication passage 216 is provided in the backup piston 64A positioned ahead of the communication hole 114. An inner circumferential side opening of the communication hole 216 is opened to the input chamber 113 at any time. The position where the communication passage 216 is such that:

when the backup piston 64A is located at its retracted position as shown in FIG. 3, the boosted hydraulic pressure application chamber is made isolated from the input-side annular chamber 93 and the input chamber 113; and when the backup piston 64A has moved forward by the predetermined stroke or more from the retraction position as shown in FIG. 6, through an outer circumferential side opening of the communication hole 216, the boosted hydraulic pressure application chamber is made communicate with the input-side annular chamber 93 and the input chamber 113.

That is, when the backup piston is located at its retracted position as shown in FIG. 3, the outer circumferential side opening of the communication passage 216 is located at a rear side of the sealing member 95, and the sealing member 95 isolates the boosted hydraulic pressure application chamber 22 from the input-side annular chamber 93 and the input chamber 113.

However, when the backup piston 64A has moved forward by the predetermined stroke or more from the retraction position as shown in FIG. 6, the outer circumferential side opening of the communication passage 216 is located at a front side of the sealing member, and the communication passage 216 communicates the boosted hydraulic pressure application chamber 22 with the input chamber 113 and the input-side annular chamber 93 with detouring the sealing member 95.

Note that the backup piston 64A moves forward so as to directly push the rear master piston 23 by virtue of the operation of the brake pedal 11 when the hydraulic pressure of the boosted hydraulic pressure application chamber 22 is low.

When the pressure regulator 65 becomes abnormal because the pressure increasing valve 62 has seized in its closed position, no boosted hydraulic pressure is applied to the boosted hydraulic pressure application chamber 22 even if the hydraulic pressure source 12 is normal. However, if the high hydraulic pressure from the hydraulic pressure source 12 remains applied to the input chamber 113, when the pressure decreasing valve 63 is closed as the control piston 66 moves forward, the high hydraulic pressure of the input chamber 113 is applied to the first and second reaction force pistons 67 and 68 making contact with the front end of the control piston 66. The backup piston 64A can be moved forward by operating the brake pedal 11 against the hydraulic pressure.

When the backup piston 64A moves forward by the predetermined stroke or more so as to directly push the rear master piston 23, the input chamber 113, i.e., the input-side annular chamber 93, communicates with the boosted hydraulic pressure application chamber 22, and the high hydraulic pressure from the hydraulic pressure source 12 is applied to the boosted hydraulic pressure application chamber 22. As a result, the rear master piston 23 of the master cylinder M moves forward, and the brake hydraulic pressure from the master cylinder M is output.

At this time, the high hydraulic pressure from the hydraulic pressure source 12 is applied to the boosted hydraulic pressure application chamber 22, and a reaction force is exerted backward to the backup piston 64A. The backup piston 64A moves back and forth so that the braking operation force exerted by the brake pedal 11 is balanced with the hydraulic pressure force due to the hydraulic pressure of the boosted hydraulic pressure application chamber 22, whereby the hydraulic pressure of the boosted hydraulic pressure application chamber 22 is adjusted.

In other words, after the backup piston 64A has moved forward by the predetermined stroke or more, it is not necessary to directly push the rear master piston 23 of the master cylinder M using the backup piston 64A, and the brake hydraulic pressure can be output securely from the master cylinder M by applying a relatively small braking operation force. Furthermore, since an electromagnetic valve other than the hydraulic pressure booster 13A is not required, the number of components can be suppressed, and since only the communication passage 216 are provided in the backup piston 64A, the structure is made simple.

Furthermore, the control piston 66 is formed into a bottomed cylindrical shape having the end wall 66a at its front end. The stroke simulator 14 provided between the brake pedal 11 and the control piston 66 has the simulator piston 194 slidably fitted into the control piston 66 while forming the stroke fluid chamber 193 between the simulator piston 194 and the end wall 66a of the control piston 66 and interlockingly connected to the input rod 197 that is connected to the brake pedal 11; and the elastic member 195 provided between the simulator piston 194 and the control piston 66. The openings 205 that are closed as a forward movement amount of the control piston 66 with respect to the backup piston 64A becomes more than a threshold value are provided in the end wall 66a of the control piston 66 so as to allow the stroke fluid chamber 193 to communicate with the reservoir 31 at the time of opening. Hence, as the forward movement amount of the control piston 66 with respect to the backup piston 64A becomes more than the threshold value, the stroke fluid chamber 193 is in a tightly closed state, and the forward movement of the simulator piston 194 with respect to the control piston 66 is restricted. As a result, the increase in the stroke of the brake pedal 11 due to use of the stroke simulator 14 can be suppressed, and the operation feeling of the brake pedal can be improved.

<Second Embodiment>

Figure 7:
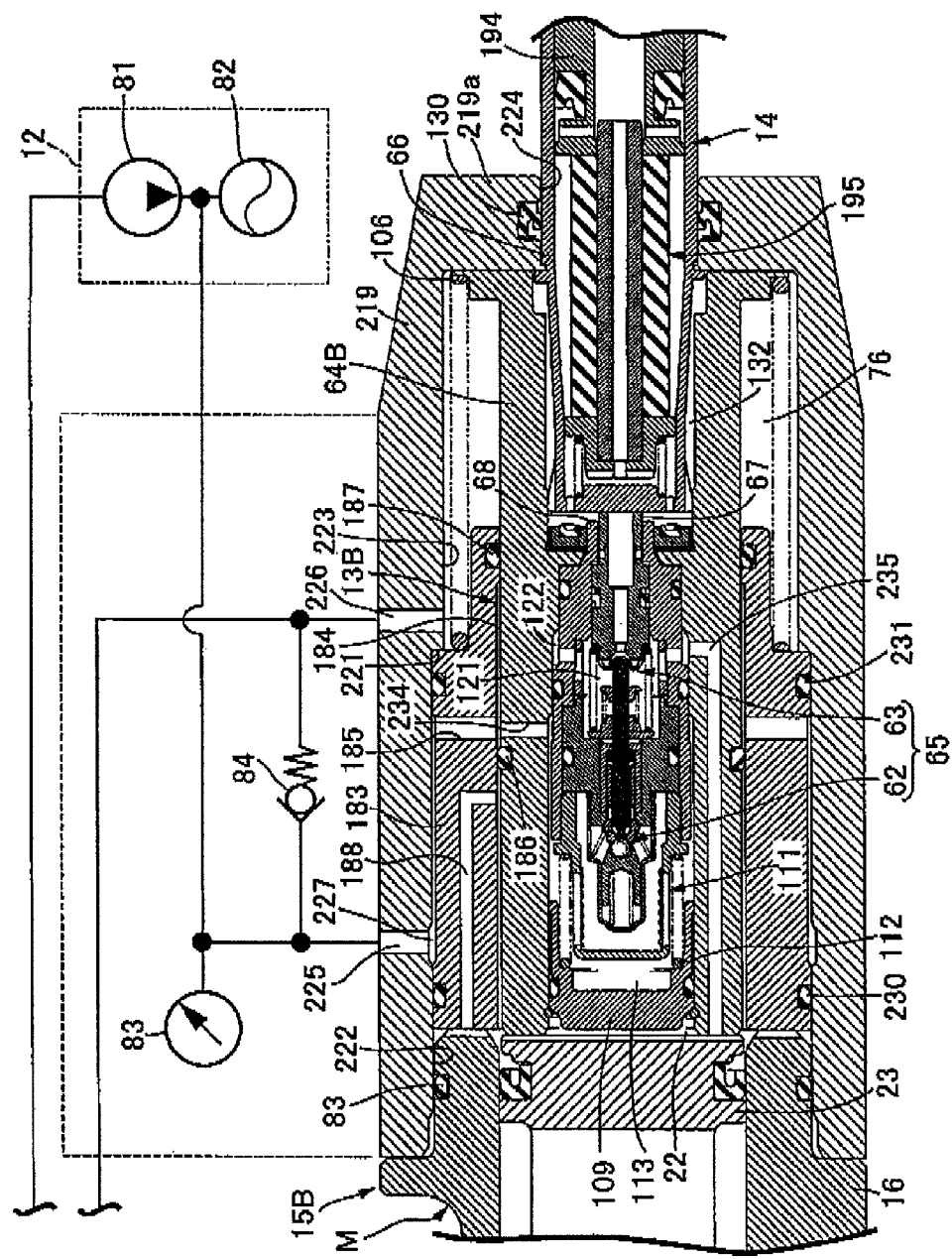
FIG. 7 is a sectional view showing a second embodiment, corresponding to FIG. 2.

FIG. 7 shows a second embodiment. Components corresponding to the above-mentioned first embodiment are designated by the same references and only shown in the figure, and their detailed descriptions are omitted.

The braking apparatus according to the second embodiment has the tandem type master cylinder M; a hydraulic pressure booster 13B for adjusting the hydraulic pressure of the hydraulic pressure source 12 depending on the braking operation force input from the brake pedal 11 and for applying the hydraulic pressure to the master cylinder M; and the stroke simulator 14 disposed between the brake pedal 11 and the hydraulic pressure booster 13B.

A casing 15B commonly housing both the master cylinder M and the hydraulic pressure booster 13B has the cylindrical member 16 having a bottomed cylindrical shape and closed at its front end; a body 219 formed into a cylindrical shape, having an inward flange section 219a at its rear end and coaxially connected to the rear section of the cylindrical member 16; and a cylindrical sleeve 183 held between the rear end of the cylindrical member 16 and the body 219. The rear end of the cylindrical member 16 is fluid-tightly fitted into the front section of the body 219, and the sleeve 183 is fluid-tightly fitted into the body 219 so as to be held between the annular step section 221 provided in the intermediate section of the body 219 around its inner circumference and the rear end of the cylinder member 16.

The hydraulic pressure booster 13B has:

a cylindrical backup piston 64B accommodated in the casing 15B while its front end faces the boosted hydraulic pressure application chamber 22;

the pressure regulator 65 having the pressure increasing valve 62 and the pressure decreasing valve 63 and built into the backup piston 64B;

the control piston 66 operating to balance the reaction force due to the hydraulic pressure of the boosted hydraulic pressure application chamber 22 with the braking operation input from the brake pedal 11 (refer to the first embodiment) and to enable the pressure regulator 65 to perform pressure adjustment;

the first reaction force piston 67 disposed between the pressure regulator 65 and the control piston 66 so as to exert the reaction force due to the hydraulic pressure of the boosted hydraulic pressure application chamber 22 to the control piston 66; and the second reaction force piston 68 disposed between the backup piston 64B and the first reaction force piston 67 so as to exert the output hydraulic pressure of the hydraulic pressure source 12 and the reaction force from the reaction spring 112 in addition to the reaction force from the first reaction force piston 67 to the control piston 66 when the braking operation input from the brake pedal 11 has increased.

The body 219 constituting a part of the casing 15B and coaxially connected to the rear section of the cylindrical member 16 has:

a large diameter hole 222 into which the rear end of the cylindrical member 16 and the sleeve 183 are fitted from the front end side thereof; and an intermediate diameter hole 223 having a diameter smaller than that of the large diameter hole 222 and coaxially connected to the rear end of the large diameter hole 222 while forming the annular step section 221 between the rear end of the large diameter hole 222 and the intermediate diameter hole 223.

The inward flange section 219a provided at the rear end of the body 219 has a small diameter hole 224 having a diameter smaller than that of the intermediate diameter hole 223 and formed so as to define the rear end of the intermediate diameter hole 223.

The backup piston 64B is slidably fitted into the sleeve 183. Furthermore, the body 219 has an input port 225 opening in the inner face of the large diameter hole 222 and a release port 226 opening in the inner face of the intermediate diameter hole 223. The input port 225 is connected to the hydraulic pressure source 12, and the release port 226 is connected to the reservoir 31 (refer to the first embodiment).

An annular chamber 227 communicating with the input port 225 is formed between the inner face of the large diameter hole 222 of the body 219 and the outer circumference of the sleeve 183. An input-side annular chamber 184 is formed between the inner circumference of the sleeve 183 and the outer circumference of the backup piston 64B. The sleeve 183 has communication hole 185 for allowing the rear section of the annular chamber 227 to communicate with the front section of the input-side annular chamber 184.

The annular chamber 227 is sealed with O-rings 230 and 231 mounted on the outer circumference of the sleeve 183 on both sides thereof. In addition, an O-ring 186 serving as an annular sealing member, mounted on the outer circumference of the backup piston 64B and making slide contact with the inner circumference of the sleeve 183 is provided to establish sealing between the input-side annular chamber 184 and the boosted hydraulic pressure application chamber 22 facing the rear face of the rear master piston 23 of the master cylinder M.

The release chamber 76 surrounding the backup piston 64B is formed between the sleeve 183 and the inward flange section 219a inside the body 219 so as to accommodate the spring 106 for biasing the backup piston 64B backward. The release chamber 76 communicates with the release port 226. Furthermore, an O-ring 187 mounted on the inner circumference of the sleeve 183 and making slide contact with the outer circumference of the backup piston 64B is provided to establish sealing between the release chamber 76 and the input-side annular chamber 184.

The end wall member 109, the front face of which faces the boosted hydraulic pressure application chamber 22, is fluid-tightly fined into the front end section of the backup piston 64B. A communication hole 234 for allowing the input-side annular chamber 184 to communicate with the input chamber 113 formed between the end wall member 109 and the filter 11 mounted on the front end of the second reaction force piston 68 and the second reaction force piston 68 inside the backup piston 64B is provided in the backup piston 64B.

Moreover, the boosted hydraulic pressure generation chamber 121 facing the front end of the first reaction force piston 67 is formed inside the second reaction force piston 68, and the annular chamber 122 communicating with the boosted hydraulic pressure generation chamber 121 is formed between the outer circumference of the second reaction force piston 68 and the inner circumference of the backup piston 64B. A communication hole 235 for allowing the annular chamber 122 to communicate with the boosted hydraulic pressure application chamber 22 is provided in the backup piston 64B.

The control piston 66 formed into a bottomed cylindrical shape having the end wall 66a at its front end is slidably fitted into the small diameter hole 224 formed in the inward flange section 219a at the rear end of the body 219 and coaxially inserted into the rear section of the backup piston 64B. In addition, the annular sealing member 130 elastically making contact with the outer circumference of the control piston 66 is mounted on the inner circumference of the inward flange section 219a, i.e., the inner face of the small diameter hole 224. The release chamber 132 communicating with the release chamber 76 is formed between the backup piston 64B and the control piston 66.

A communication passage 188 is provided in the sleeve 183. One end of the communication passage 138 is opened to the boosted hydraulic pressure application chamber 22. The other end of the communication passage 188 is opened to an inner circumference of the sleeve 183 at a position front side of the communication hole 185.

The other end of the communication hole 188 is provided such that:

when the backup piston 64B is located at its retraction position, the other end of the communication passage 188 is located at a front side of the O-ring 186; and when the backup piston 64B has moved forward by the predetermined stroke or more from the retraction position, the other end of the communication passage 188 is made communicate with a communication hole 234 which is provided at a rear side of the O-ring 186.

Thus, when the backup piston 64B is located at its retraction position, the input-side annular chamber 184 is isolated from the boosted hydraulic pressure application chamber 22.

On the other hand, when the hydraulic pressure of the boosted hydraulic pressure application chamber 22 is low and the backup piston 64B moves forward so as to directly push the rear master piston 23 by virtue of the operation of the brake pedal 11, the communication passage 188 communicates with the communication hole 234 and the input-side ring-shape chamber 184 communicates with the boosted hydraulic pressure application chamber 22.

With the second embodiment, the O-ring 186 passes the opening end of the communication passage 188 communicating with the inner circumferential face of the sleeve 183 as the backup piston 64B moves forward by the predetermined stroke or more so as to directly push the rear master piston 23 of the master cylinder M, whereby the input-side annular chamber 184 connected to the hydraulic pressure source 12 communicates with the boosted hydraulic pressure application chamber 22 via the communication passage 188 provided in the sleeve 183 constituting a part of the casing 15B.

Hence, as well as the first embodiment, after the backup piston 64B has moved forward by the predetermined stroke or more, it is not necessary to directly push the rear master piston 23 of the master cylinder M using the backup piston 64B, and the brake hydraulic pressure can be output securely from the master cylinder M by applying a relatively small braking operation force. Furthermore, since an electromagnetic valve other than the hydraulic pressure booster 13B is not required, the number of components can be avoided from increasing, and since only the communication passage 188 is provided in the sleeve 183, the structure is made simple.

<Third Embodiment>

Figure 8:
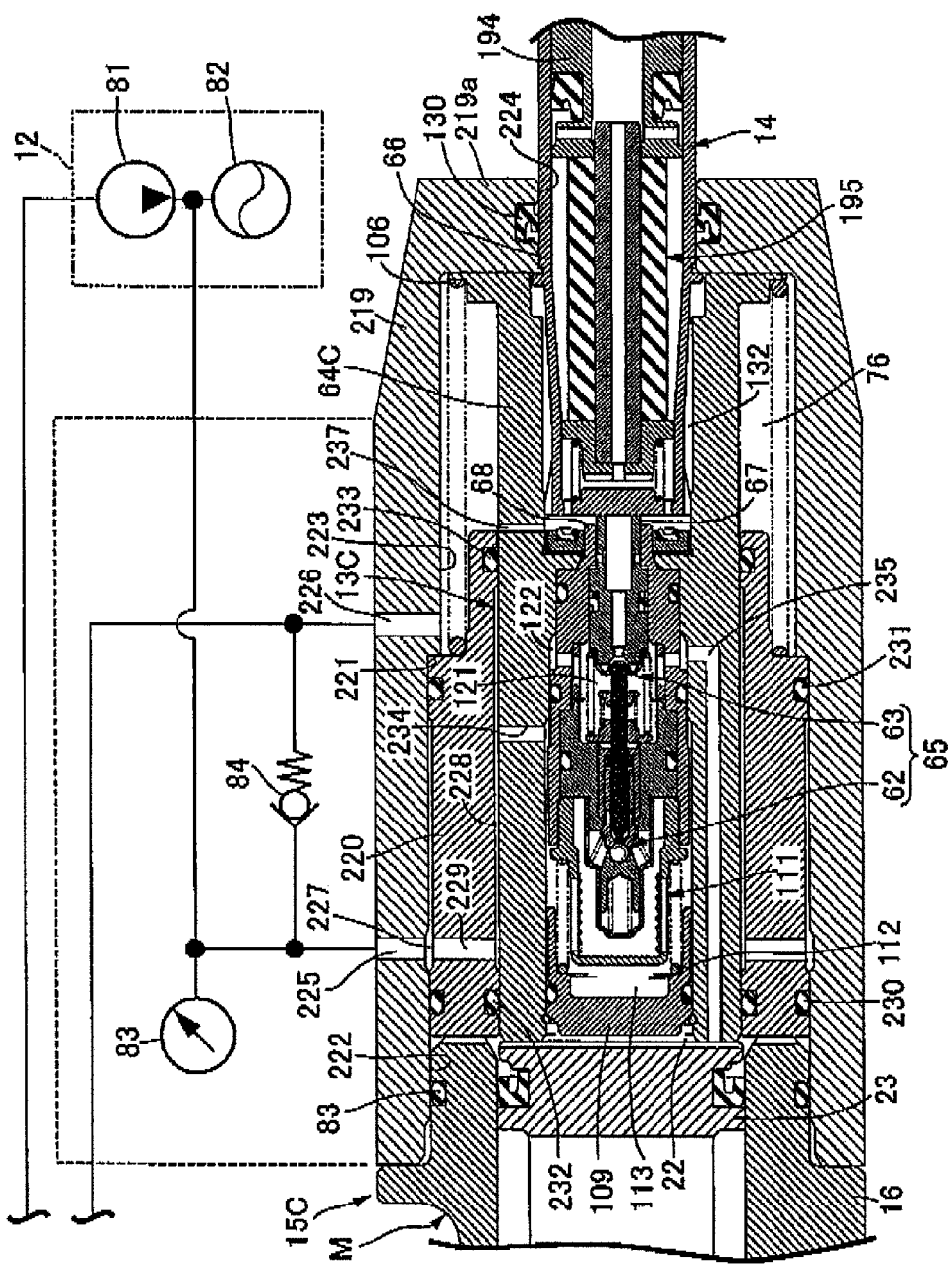
FIG. 8 is a sectional view showing a third embodiment, corresponding to FIG. 2.

FIG. 8 shows a third embodiment. Components corresponding to the above-mentioned first and second embodiments are designated by the same references and only shown in the figure, and their detailed descriptions are omitted.

The braking apparatus according to the third embodiment has the tandem type master cylinder M; a hydraulic pressure booster 13C for adjusting the hydraulic pressure of the hydraulic pressure source 12 depending on the braking operation force input from the brake pedal 11 and for applying the hydraulic pressure to the master cylinder M; and the stroke simulator 14 disposed between the brake pedal 11 and the hydraulic pressure booster 13C.

A casing 15C commonly housing both the master cylinder M and the hydraulic pressure booster 13C has the cylindrical member 16 having a bottomed cylindrical shape and closed at its front end; a body 219 formed into a cylindrical shape, having an inward flange section 219a at its rear end and coaxially connected to the rear section of the cylindrical member 16; and a cylindrical sleeve 220 held between the rear end of the cylindrical member 16 and the body 219. The rear end of the cylindrical member 16 is fluid-tightly fitted into the front section of the body 219, and the sleeve 220 is fluid-tightly fitted into the body 219 so as to be held between the annular step section 221 provided in the intermediate section of the body 219 around its inner circumference and the rear end of the cylinder member 16.

The hydraulic pressure booster 13C has:

a cylindrical backup piston 64C accommodated in the casing 15C while its front end faces the boosted hydraulic pressure application chamber 22;

the pressure regulator 65 having the pressure increasing valve 62 and the pressure decreasing valve 63 and built into the backup piston 64C;

the control piston 66 operating to balance the reaction force due to the hydraulic pressure of the boosted hydraulic pressure application chamber 22 with the braking operation input from the brake pedal 11 (refer to the first embodiment) and to enable the pressure regulator 65 to perform pressure adjustment;

the first reaction force piston 67 disposed between the pressure regulator 65 and the control piston 66 so as to exert the reaction force due to the hydraulic pressure of the boosted hydraulic pressure application chamber 22 to the control piston 66; and the second reaction force piston 68 disposed between the backup piston 64C and the first reaction force piston 67 so as to exert the output hydraulic pressure of the hydraulic pressure source 12 and the reaction force from the reaction spring 112 in addition to the reaction force from the first reaction force piston 67 to the control piston 66 when the braking operation input from the brake pedal 11 has increased.

The body 219 constituting a part of the casing 15C and coaxially connected to the rear section of the cylindrical member 16 has a large diameter hole 222 into which the rear end of the cylindrical member 16 and the sleeve 220 are fitted from the front end side thereof; and an intermediate diameter hole 223 having a diameter smaller than that of the large diameter hole 222 and coaxially connected to the rear end of the large diameter hole 222 while forming the annular step section 221 between the rear end of the large diameter hole 222 and the intermediate diameter hole 223.

The inward flange section 219a provided at the rear end of the body 219 has a small diameter hole 224 having a diameter smaller than that of the intermediate diameter hole 223 and formed so as to define the rear end of the intermediate diameter hole 223.

The backup piston 64C is slidably fitted into the sleeve 220. Furthermore, the body 219 has an input port 225 opened in the inner face of the large diameter hole 222 and a release port 226 opened in the inner face of the intermediate diameter hole 223. The input port 225 is connected to the hydraulic pressure source 12, and the release port 226 is connected to the reservoir 31 (refer to the first embodiment).

The annular chamber 227 communicating with the input port 225 is formed between the inner face of the large diameter hole 222 of the body 219 and the outer circumference of the sleeve 220. An input-side annular chamber 228 is formed between the inner circumference of the sleeve 220 and the outer circumference of the backup piston 64C. The sleeve 220 has communication hole 229 for establishing communication between the annular chamber 227 and the input-side annular chamber 228.

The annular chamber 227 is sealed with the O-rings 230 and 231 mounted on the outer circumference of the sleeve 220 on both sides thereof In addition, an O-ring 232 mounted on the inner circumference of the sleeve 220 and making slide contact with the outer circumference of the backup piston 64C is provided to establish sealing between the input-side annular chamber 228 and the boosted hydraulic pressure application chamber 22 facing the rear face of the rear master piston 23 of the master cylinder M.

The release chamber 76 surrounding the backup piston 64C is formed between the sleeve 220 and the inward flange section 219a inside the body 219 so as to accommodate the spring 106 for biasing the backup piston 64C backward. The release chamber 76 communicates with the release port 226. Furthermore, an O-ring 233 serving as an annular sealing member, mounted on the inner circumference of the sleeve 220 and making slide contact with the outer circumference of the backup piston 64C is provided to establish sealing between the release chamber 76 and the input-side annular chamber 228.

The end wall member 109, the front face of which faces the boosted hydraulic pressure application chamber 22, is fluid-tightly fitted into the front end section of the backup piston 64C. The communication hole 234 for allowing the input-side annular chamber 228 to communicate with the input chamber 113 formed between the end wall member 109 and the filter 111 mounted on the front end of the second reaction force piston 68 and the second reaction force piston 68 inside the backup piston 64C is provided in the backup piston 64C.

Moreover, the boosted hydraulic pressure generation chamber 121 facing the front end of the first reaction force piston 67 is formed inside the second reaction force piston 68, and the annular chamber 122 communicating with the boosted hydraulic pressure generation chamber 121 is formed between the outer circumference of the second reaction force piston 68 and the inner circumference of the backup piston 64C. The communication hole 235 for allowing the annular chamber 122 to communicate with the boosted hydraulic pressure application chamber 22 is formed in the backup piston 64C.

The control piston 66 formed into a bottomed cylindrical shape having the end wall 66a at its front end is slidably fitted into the small diameter hole 224 formed in the inward flange section 219a at the rear end of the body 219 and coaxially inserted into the rear section of the backup piston 64C. In addition, the annular sealing member 130 elastically making contact with the outer circumference of the control piston 66 is mounted on the inner circumference of the inward flange section 219a, i.e., the inner face of the small diameter hole 224. The release chamber 132 communicating with the release chamber 76 is formed between the backup piston 64C and the control piston 66.

A communication passage 237 is provided in the backup piston 64C. An inner circumference opening of the communication passage 237 is opened to the release chamber 132.

The communication passage 237 is provided such that:

when the backup piston 64C is located at its retracted position as shown in FIG. 8, the release chamber 132 is made isolated from the input-side annular chamber 228 by the O-ring 233; and when the backup piston 64C has moved forward by the predetermined stroke or more from the retraction position, the input-side annular chamber 228 is made communicate with the release chamber 132 through the communication passage 237.

That is, when the backup piston 64C is located at its retracted position as shown in FIG. 8, an outer circumference opening of the communication passage 237 is located at rear side of the O-ring 233 and the O-ring 233 isolates the release chamber 132 from the input-side annular chamber 228.

On the other hand, when the backup piston 64C has moved forward by the predetermined stroke or more from the retraction position, the outer circumference opening of the communication passage 237 is located at front side of the O-ring 233 and the communication passage 237 communicates the release chamber 132 with the input-side annular chamber 132 with detouring the O-ring 233.

Note that the backup piston 64C moves forward so as to directly push the rear master piston 23 by virtue of the operation of the brake pedal 11 when the hydraulic pressure of the boosted hydraulic pressure application chamber 22 is low.

With the third embodiment, the communication passage 237 passes the O-ring 233 as the backup piston 64C moves forward by the predetermined stroke or more so as to directly push the rear master piston 23 of the master cylinder M, whereby the input-side annular chamber 228 connected to the hydraulic pressure source 12 communicates with the release chamber 132 connected to the reservoir 31 via the communication passage 237 provided in the backup piston 64C. With this simple configuration having small number of components, when the hydraulic pressure of the boosted hydraulic pressure application chamber 22 is low due to abnormality in the pressure regulator 65, the rear master piston 23 can be moved forward by directly pushing the rear master piston 23 by using the backup piston 64C to which the hydraulic pressure output from the hydraulic pressure source 12 is not applied from the side opposite to the application direction of the braking operation force. As a result, the brake hydraulic pressure can be output securely from the master cylinder M by applying a small braking operation force.

<Fourth Embodiment>

Figure 9:
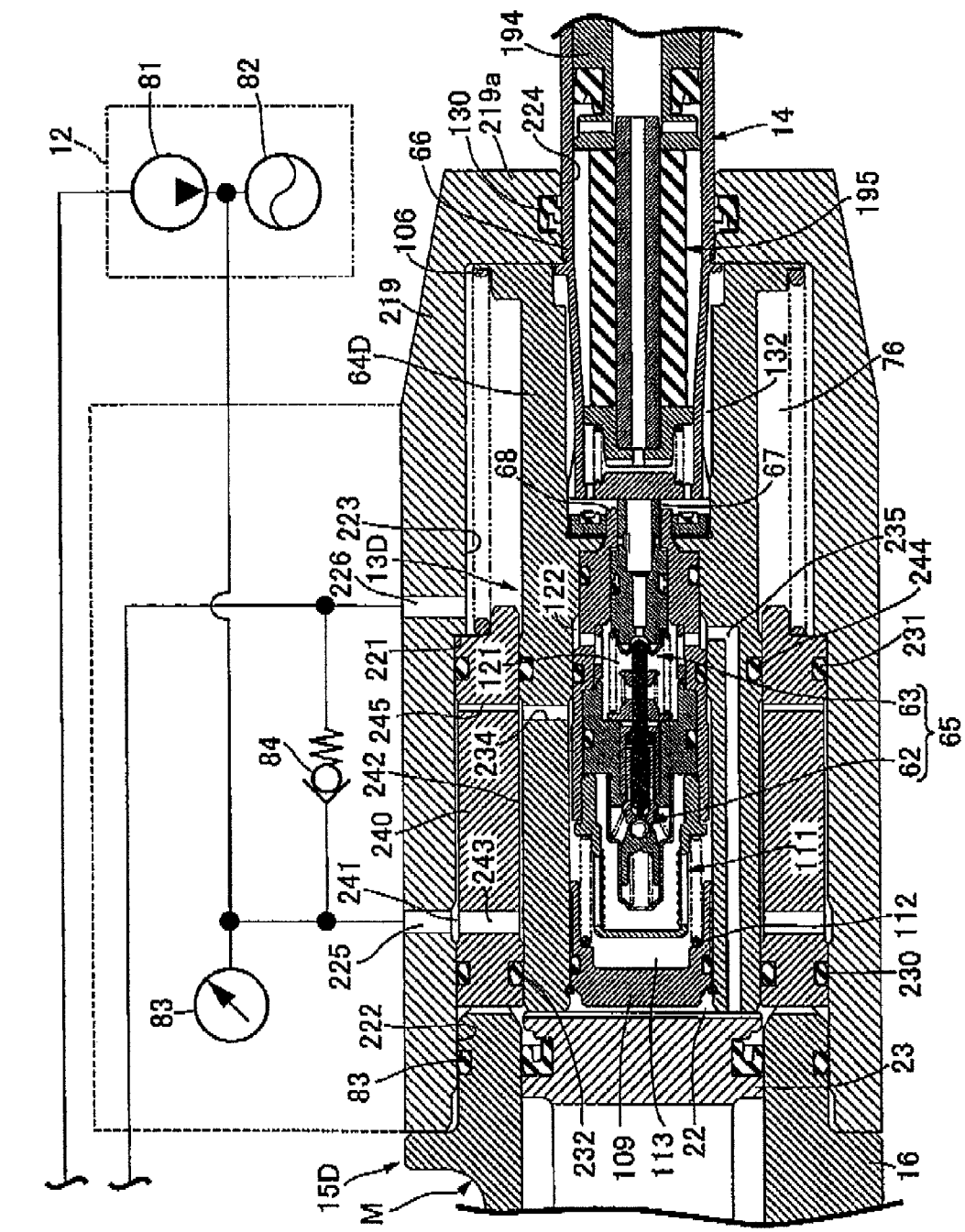
FIG. 9 is a sectional view showing a fourth embodiment, corresponding to FIG. 2.

FIG. 9 shows a fourth embodiment of the present invention. Components corresponding to the above-mentioned first to third embodiments are designated by the same references and only shown in the figure, and their detailed descriptions are omitted.

The braking apparatus according to the fourth embodiment has the tandem type master cylinder M; a hydraulic pressure booster 13D for adjusting the hydraulic pressure of the hydraulic pressure source 12 depending on the braking operation force input from the brake pedal 11 and for applying the hydraulic pressure to the master cylinder M; and the stroke simulator 14 disposed between the brake pedal 11 and the hydraulic pressure booster 13D.

A casing 15D commonly housing both the master cylinder M and the hydraulic pressure booster 13D has the cylindrical member 16 having a bottomed cylindrical shape and closed at its front end; the body 219 formed into a cylindrical shape, having an inward flange section 219a at its rear end and coaxially connected to the rear section of the cylindrical member 16; and a cylindrical sleeve 240 held between the rear end of the cylindrical member 16 and the body 219. The rear end of the cylindrical member 16 is fluid-tightly fitted into the front section of the body 219, and the sleeve 240 is fluid-tightly fined into the body 219 so as to be held between the annular step section 221 provided in the intermediate section of the body 219 around its inner circumference and the rear end of the cylinder member 16.

The hydraulic pressure booster 13D has:

a cylindrical backup piston 64D accommodated in the casing 15D while its front end faces the boosted hydraulic pressure application chamber 22, the pressure regulator 65 leaving the pressure increasing valve 62 and the pressure decreasing valve 63 and built into the backup piston 64D;

the control piston 66 operating to balance the reaction force due to the hydraulic pressure of the boosted hydraulic pressure application chamber 22 with the braking operation input from the brake pedal 11 (refer to the first embodiment) and to enable the pressure regulator 65 to perform pressure adjustment;

the first reaction force piston 67 disposed between the pressure regulator 65 and the control piston 66 so as to exert the reaction force due to the hydraulic pressure of the boosted hydraulic pressure application chamber 22 to the control piston 66; and the second reaction force piston 68 disposed between the backup piston 64D and the first reaction force piston 67 so as to exert the output hydraulic pressure of the hydraulic pressure source 12 and the reaction force from the reaction spring 112 in addition to the reaction force from the first reaction force piston 67 to the control piston 66 when the braking operation input from the brake pedal 11 has increased.

The backup piston 64D is slidably fitted into the sleeve 240. An annular chamber 241 communicating with the input port 225 is formed between the inner face of the large diameter hole 222 of the body 219 and the outer circumference of the sleeve 240. An input-side annular chamber 242 is formed between the inner circumference of the sleeve 240 and the outer circumference of the backup piston 64D. The sleeve 240 has communication hole 243 for establishing communication between the annular chamber 241 and the input-side annular chamber 242.

The annular chamber 241 is sealed with the O-rings 230 and 231 mounted on the outer circumference of the sleeve 240 on both sides thereof. In addition, the O-ring 232 mounted on the inner circumference of the sleeve 240 and making slide contact with the outer circumference of the backup piston 64D is provided to establish sealing between the input-side annular chamber 242 and the boosted hydraulic pressure application chamber 22 facing the rear face of the rear master piston 23 of the master cylinder M.

The release chamber 76 surrounding the backup piston 64D is formed between the sleeve 220 and the inward flange section 219a inside the body 219 so as to accommodate the spring 106 for biasing the backup piston 64D backward. The release chamber 76 communicates with the release port 226. Furthermore, an O-ring 244 serving as an annular sealing member, mounted on the outer circumference of the backup piston 64D and making slide contact with the inner circumference of the sleeve 240 is provided to establish sealing between the release chamber 76 and the input-side annular chamber 242.

The end wall member 109, the front face of which faces the boosted hydraulic pressure application chamber 22, is fluid-tightly fitted into the front end section of the backup piston 64D. The communication hole 234 for allowing the input-side annular chamber 242 to communicate with the input chamber 113 formed between the end wall member 109 and the filter 111 mounted on the front end of the second reaction force piston 68 and the second reaction force piston 68 inside the backup piston 64D is provided in the backup piston 64D.

Moreover, the boosted hydraulic pressure generation chamber 121 facing the front end of the first reaction force piston 67 is formed inside the second reaction force piston 68, and the annular chamber 122 communicating with the boosted hydraulic pressure generation chamber 121 is formed between the outer circumference of the second reaction force piston 68 and the inner circumference of the backup piston 64D. The communication hole 235 for allowing the annular chamber 122 to communicate with the boosted hydraulic pressure application chamber 22 is provided in the backup piston 64D.

The control piston 66 is slidably fitted into the small diameter hole 224 formed in the inward flange section 219a at the rear end of the body 219 and coaxially inserted into the rear section of the backup piston 64D. The annular sealing member 130 elastically making contact with the outer circumference of the control piston 66 is mounted on the inner circumference of the inward flange section 219a, i.e., the inner face of the small diameter hole 224. The release chamber 132 communicating with the release chamber 76 is formed between the backup piston 64D and the control piston 66.

A communication passage 245 is provided in the backup piston 64D. An outer circumference opening of the communication passage 245 is opened to the annular chamber 241.

The communication passage 245 is provided such that; when the backup piston 64D is located at its retracted position as shown in FIG. 9, the annular chamber 241 is made isolated from the release chamber 76 by the O-ring 244; and when the backup piston 64D has moved forward by the predetermined stroke or more from the retraction position, the annular chamber 241 is made communicate with the release chamber 76 through the communication passage 245.

That is, when the backup piston 64D is located at its retracted position as shown in FIG. 9, an inner circumference opening of the communication passage 245 is located at front side of the O-ring 244 and the O-ring 244 isolates the release chamber 76 from the annular chamber 241.

On the other hand, when the backup piston 64D has moved forward by the predetermined stroke or more from the retraction position, the inner circumference opening of the communication passage 245 is located at rear side of the O-ring 244 and the communication passage 245 communicates the release chamber 76 with the annular chamber 241 with detouring the O-ring 244.

Note that the backup piston 64D moves forward so as to directly push the rear master piston 23 by virtue of the operation of the brake pedal 11 when the hydraulic pressure of the boosted hydraulic pressure application chamber 22 is low.

With the fourth embodiment, the O-ring 244 passes the communication passage 245 as the backup piston 64D moves forward by the predetermined stroke or more so as to directly push the rear master piston 23 of the master cylinder M, whereby the input-side annular chamber 242 connected to the hydraulic pressure source 12 communicates with the release chamber 76 connected to the reservoir 31 via the communication passage 245 provided in the backup piston 64D. With this simple configuration having small number of components, when the hydraulic pressure of the boosted hydraulic pressure application chamber 22 is low due to abnormality in the pressure regulator 65, the rear master piston 23 can be moved forward by directly pushing the rear master piston 23 by using the backup piston 64D to which the hydraulic pressure output from the hydraulic pressure source 12 is not applied from the side opposite to the application direction of the braking operation force. As a result the brake hydraulic pressure can be output securely from the master cylinder M by applying a small braking operation force.

Although the embodiments according to the present invention have been described above, the present invention is not limited to the above-mentioned embodiments, and various design changes can be made without departing from the scope of the present invention as set forth in the appended claims.

What is claimed is:

1. A vehicular brake apparatus comprising:
  a master cylinder comprising:
    a casing; and
    a master piston of which rear face faces a boosted hydraulic pressure application chamber and which is slidably accommodated in the casing;
  a hydraulic pressure source capable of generating hydraulic pressure regardless of an operation of a brake operation member; and
  a hydraulic pressure booster comprising:
    a backup piston which is slidably fitted into the casing while a front face thereof facing the boosted hydraulic pressure application chamber and a retraction limit thereof is restricted;
    a pressure regulator built into the backup piston and being capable of adjusting the hydraulic pressure output from the hydraulic pressure source and applying the hydraulic pressure to the boosted hydraulic pressure application chamber; and
    a control piston operating to balance reaction force due to the hydraulic pressure of the boosted hydraulic pressure application chamber with braking operation force of the brake operation member and to enable the pressure regulator to perform pressure adjustment,
  wherein the backup piston moves forward to directly push the master piston against the hydraulic pressure force due to the hydraulic pressure output from the hydraulic pressure source as the brake operation force is transmitted from the control piston to the backup piston when the hydraulic pressure of the boosted hydraulic pressure application chamber is low,
  wherein an input-side annular chamber connected to the hydraulic pressure source is provided between the casing and the backup piston,
  an annular sealing member which seals between the boosted hydraulic pressure application chamber and the input-side annular chamber is disposed between the casing and the backup piston, and a communication passage is provided in one of the backup piston and the casing, and the communication passage communicates the input-side annular chamber with the boosted hydraulic pressure application chamber as the backup piston moves forward by a predetermined stroke or more so as to directly push the master piston.

2. The vehicular brake apparatus according to claim 1, wherein the control piston is formed into a bottomed cylindrical shape having an end wall at the front end thereof, a stroke simulator is disposed between the brake operation member and the control piston so as to obtain an operation stroke feeling of the brake operation member, the stroke simulator comprises:
- an input member connected to the brake operation member;
- a simulator piston slidably fitted into the control piston and interlockingly connected to the input rod;
- a stroke fluid chamber defined between the simulator piston and the end wall of the control piston and; and
- an elastic member provided between the simulator piston and the control piston, and an opening which allows the stroke fluid chamber to communicate with the reservoir is provided in the end wall of the control piston, when a forward movement amount of the control piston with respect to the backup piston becomes more than a threshold value, the opening is closed.

3. A vehicular brake apparatus comprising;

a master cylinder comprising:
- a casing; and
- a master piston of which rear face faces a boosted hydraulic pressure application chamber and which is slidably accommodated in the casing;

a hydraulic pressure source capable of generating hydraulic pressure regardless of an operation of a brake operation member; and a hydraulic pressure booster comprising:
- a backup piston which is slidably fitted into the casing while a front face thereof facing the boosted hydraulic pressure application chamber and a retraction limit thereof is restricted;
- a pressure regulator built into the backup piston and being capable of adjusting the hydraulic pressure output from the hydraulic pressure source and applying the hydraulic pressure to the boosted hydraulic pressure application chamber; and
- a control piston operating to balance reaction force due to the hydraulic pressure of the boosted hydraulic pressure application chamber with braking operation force of the brake operation member and to enable the pressure regulator to perform pressure adjustment, wherein the backup piston moves forward to directly push the master piston against the hydraulic pressure force due to the hydraulic pressure output from the hydraulic pressure source as the brake operation force is transmitted from the control piston to the backup piston when the hydraulic pressure of the boosted hydraulic pressure application chamber is low, wherein an input-side annular chamber connected to the hydraulic pressure source is provided between the casing and the backup piston, a release chamber connected to a reservoir is provided inside the casing, an annular sealing member sealing between the input-side annular chamber and the release chamber is provided between the casing and the backup piston, and a communication passage is provided in one of the casing and the backup piston, and the communication passage communicates the input-side annular chamber with the release chamber as the backup piston moves forward by a predetermined stroke or more so as to directly push the master piston.

* * * * *